United States Patent
Jiao

(10) Patent No.: US 12,444,225 B2
(45) Date of Patent: Oct. 14, 2025

(54) CONTACTLESS BIOMETRIC AUTHENTICATION METHODS AND SYSTEMS

(71) Applicant: Tencent Technology (Shenzhen) Company Limited, Shenzhen (CN)

(72) Inventor: Lulu Jiao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/777,019

(22) Filed: Jul. 18, 2024

(65) Prior Publication Data

US 2024/0378924 A1    Nov. 14, 2024

Related U.S. Application Data

(63) Continuation of application No. PCT/CN2023/097392, filed on May 31, 2023.

(30) Foreign Application Priority Data

Jul. 27, 2022   (CN) .......................... 202210893900.8

(51) Int. Cl.
*G06V 40/13*        (2022.01)
*G06F 3/03*         (2006.01)
(Continued)

(52) U.S. Cl.
CPC ........ *G06V 40/1312* (2022.01); *G06F 3/0304* (2013.01); *G06F 21/32* (2013.01);
(Continued)

(58) Field of Classification Search
CPC .............. G06V 40/67; G06V 40/1312; G06V 40/1365; G06V 40/45; G06V 40/13;
(Continued)

(56) References Cited

U.S. PATENT DOCUMENTS

2015/0074615 A1* 3/2015 Han ...................... H04W 12/06
                                                            715/863
2018/0335930 A1* 11/2018 Scapel .................... H04L 51/10
(Continued)

FOREIGN PATENT DOCUMENTS

CN          1726866 A        2/2006
CN        101145199 A        3/2008
(Continued)

OTHER PUBLICATIONS

Oct. 19, 2024—(CN) Notice of First Office Action—App 202210893900.8—Eng Tran.
(Continued)

*Primary Examiner* — Premal R Patel
(74) *Attorney, Agent, or Firm* — Banner & Witcoff, Ltd.

(57) ABSTRACT

This application relates to an image capturing method and apparatus, a computer device, a storage medium, and a computer program product, for performing contactless biometric authentication. The contactless biometric authentication technique may include in response to a virtual character display operation triggered by a target part of a target object, controlling a display element to display a virtual character; controlling a character posture of the virtual character based on a relative position of the target part relative to an image capturing element; and when the duration in which the character posture of the virtual character remains a preset posture satisfies a preset capturing condition, triggering the image capturing element to capture an image of the target part.

20 Claims, 13 Drawing Sheets

Keep the palm in balance

(51) Int. Cl.
*G06F 21/32* (2013.01)
*G06T 13/40* (2011.01)
*G06V 40/12* (2022.01)
*G06V 40/40* (2022.01)
*G06V 40/60* (2022.01)

(52) U.S. Cl.
CPC .......... *G06T 13/40* (2013.01); *G06V 40/1365* (2022.01); *G06V 40/45* (2022.01); *G06V 40/67* (2022.01)

(58) Field of Classification Search
CPC ....... G06V 40/60; G06F 3/0304; G06F 21/32; G06T 13/40; G06T 13/80
See application file for complete search history.

(56) References Cited

U.S. PATENT DOCUMENTS

| | | | | |
|---|---|---|---|---|
| 2019/0392189 A1* | 12/2019 | Kumar | ............... | G06V 40/1312 |
| 2020/0302147 A1* | 9/2020 | Gabriele | ............. | G02B 5/3058 |
| 2021/0150239 A1* | 5/2021 | Yoon | .................. | G06V 40/1312 |
| 2022/0114245 A1* | 4/2022 | Krishan | .................. | G06F 21/32 |
| 2022/0374137 A1* | 11/2022 | Triverio | .............. | G06F 3/04845 |
| 2023/0215219 A1* | 7/2023 | Lee | ...................... | G06V 40/161 |
| | | | | 382/181 |

FOREIGN PATENT DOCUMENTS

| | | |
|---|---|---|
| CN | 108875473 A | 11/2018 |
| CN | 110175514 A | 8/2019 |
| CN | 110908568 A | 3/2020 |
| CN | 114332964 A | 4/2022 |
| CN | 114723450 A | 7/2022 |
| WO | 2004021884 A1 | 3/2004 |

OTHER PUBLICATIONS

Feb. 22, 2025—(CN) Notice of Second Office Action—App 202210893900.8.

* cited by examiner

CONTACTLESS BIOMETRIC AUTHENTICATION METHODS AND SYSTEMS

CROSS REFERENCE TO RELATED APPLICATIONS

This application is a continuation application of PCT Application PCT/CN2023/097392, filed May 31, 2023, which claims priority to Chinese Patent Application No. 202210893900.8, filed on Jul. 27, 2022, each entitled "IMAGE CAPTURING METHOD AND APPARATUS, COMPUTER DEVICE, AND STORAGE MEDIUM", and each of which is incorporated herein by reference in its entirety.

FIELD OF THE TECHNOLOGY

This application relates to the technical field of image processing, and specifically, to an image capturing method and apparatus, a computer device, a storage medium, and a computer program product for performing contactless biometric authentication.

BACKGROUND OF THE DISCLOSURE

With the development of image recognition technologies, biometric authentication based on image has been widely used in various fields. The biometric authentication includes facial recognition authentication, palm print recognition authentication, or iris recognition authentication.

During biometric authentication, a user needs to constantly adjust a position of a part to be captured, so that the part to be captured is in a suitable position. Using palm print recognition as an example, the premise of palm print recognition is capturing palm prints. At present, a common way of capturing palm prints is contact capture. In the method of contact palm print capture, the user needs to place the hand on a capturing device, and adjust the position of the hand, so that the hand is located in a capturing area specified by the capturing device, so that the capturing device can take images of the palm.

However, the user needs to continuously move the palm to place the palm in the capturing area designated by the capturing device. The user can only successfully capture the palm prints after repeatedly placing the palm, and capturing efficiency is low.

SUMMARY

Based on this, it is necessary to provide an image capturing method and apparatus, a computer device, a computer-readable storage medium, and a computer program product in view of the foregoing technical problem, to improve image capturing efficiency.

According to aspects of this application, this application provides an image capturing method. The method includes:

in response to a virtual character display operation triggered by a target part of a target object, displaying a virtual character, a character posture of the virtual character being related to a relative position of the target part relative to an image capturing element;

in a case that the relative position of the target part relative to the image capturing element changes, changing a character posture of a currently displayed virtual character according to the change of the relative position; and in a case that duration in which the character posture of the virtual character remains a preset posture satisfies a preset capturing condition, triggering the image capturing element to capture a part image of the target part.

According to aspects of this application, this application further provides an image capturing apparatus. The apparatus includes:

a display module, configured to: in response to a virtual character display operation triggered by a target part of a target object, display a virtual character, a character posture of the virtual character being related to a relative position of the target part relative to an image capturing element;

the display module being further configured to: in a case that the relative position of the target part relative to the image capturing element changes, change a character posture of a currently displayed virtual character according to the change of the relative position; and a capture module, configured to: in a case that duration in which the character posture of the virtual character remains a preset posture satisfies a preset capturing condition, trigger the image capturing element to capture a part image of the target part.

According to aspects of this application, this application further provides a computer device. The computer device includes a memory and a processor, the memory having a computer program stored therein, and the processor, when executing the computer program, implements the operations of the foregoing image capturing method.

According to aspects of this application, this application further provides a computer-readable storage medium. The computer-readable storage medium has a computer program stored therein, and when the computer program is executed by a processor, the operations of the image capturing method are implemented.

According to aspects of this application, this application further provides a computer program product. The computer program product includes a computer program, and when the computer program is executed by a processor, the operations of the image capturing method are implemented.

To better describe and illustrate the aspects and/or examples of the present disclosure disclosed herein, refer to one or more of the accompanying drawings. Additional details or examples used to describe the accompanying drawings are not to be considered as limiting the scope of any one of the disclosed disclosure, the aspects and/or examples currently described, or the preferred modes of these disclosures as currently understood.

DETAILED DESCRIPTION

To make the objectives, technical solutions, and advantages of this application clearer, the following further describes this application in detail with reference to the accompanying drawings and the aspects. The specific aspects described herein are only used for explaining this application, and are not used for limiting this application.

Figure 1:
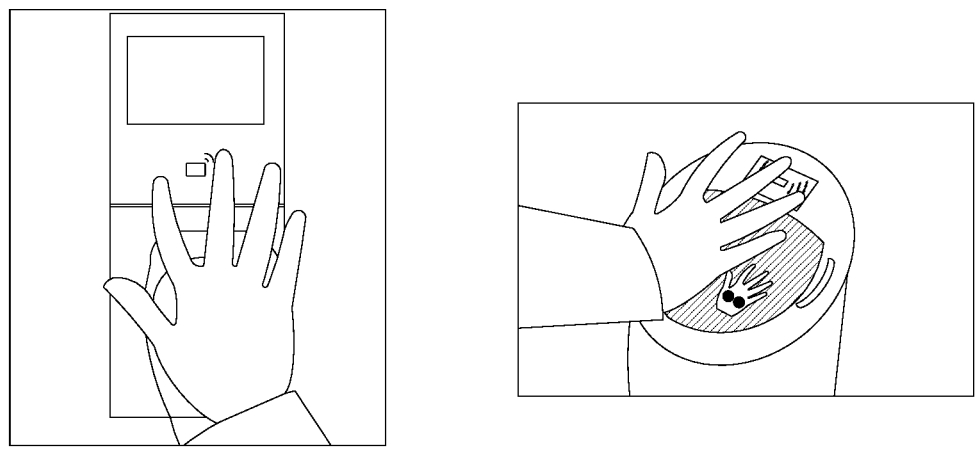
FIG. 1 is a schematic diagram of a current palm scan capturing method according to some illustrative aspects.

As shown in FIG. 1, the current palm scan capturing method requires users to constantly try and adjust the placement position of the hand, and capturing efficiency is low. Moreover, the contact palm scan capturing method requires special capturing devices. For example, a palm vein sensor needs to be disposed in the capturing device to sense veins under the palm skin. This method has a specific requirement on hardware performance.

In view of this, an aspect of this application provides an image capturing method, which abandons the contact palm scan capturing method, and captures palm prints in a contactless (also referred to herein as "non-contact") palm scan capturing method, breaking the rigid demand for hardware infrastructure. In the non-contact palm scan capturing method, by capturing the image of the palm print of the hand, and displaying the palm concretely through the character posture of the virtual character in the display interface, the posture of the user's palm can be easily understood and fed back, helping the user to perform adjustment, thereby greatly improving capturing and processing rate (e.g., for a payment transaction), improving user convenience, and facilitating quick capture of the user.

Figure 2:
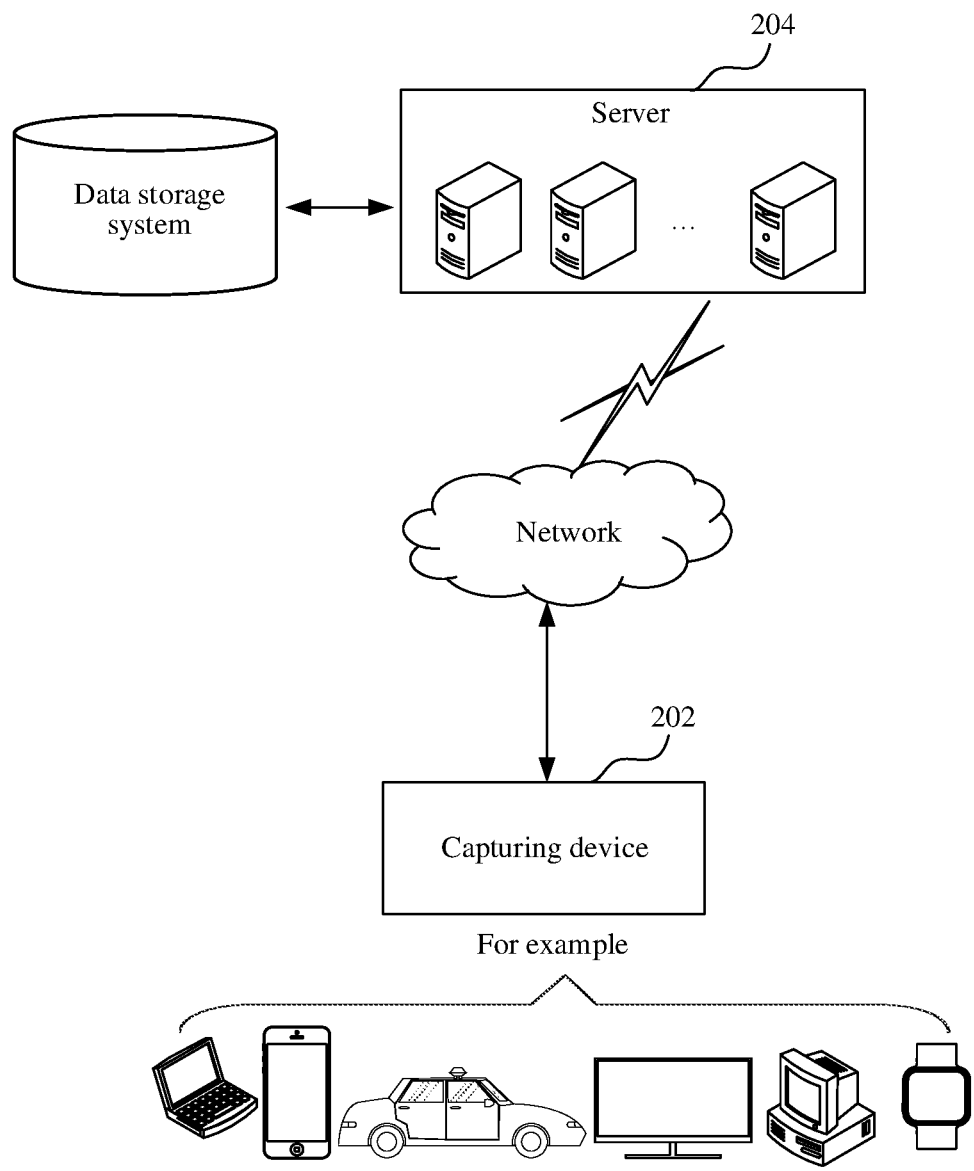
FIG. 2 is a diagram of an application environment of an image capturing method according to some illustrative aspects.

The image capturing method according to the aspects of this application may be applied in an application environment shown in FIG. 2. A capturing device 202 communicates with a server 204 through a network. A data storage system may store data that the server 204 needs to process. The data storage system may be integrated on the server 204, or may be on the cloud or other servers.

In some aspects, the target object triggers a virtual character display operation by placing a target part within a visible range of an image capturing element, to display the virtual character by using a display element. When the target object changes a relative position of the target part relative to the image capturing element, the character posture of the virtual character also changes accordingly. The target object can adjust the relative position of the target part relative to the image capturing element based on the character posture of the displayed virtual character, so that the character posture of the virtual character is a preset posture. After the character posture of the virtual character remains the preset posture for specific duration, the image capturing element is triggered to capture a part image of the target part.

The capturing device 202 is configured to capture a key area image of the target part of the target object. The capturing device 202 includes at least an image capturing element, and the image capturing element is configured to capture an object within a visible range. The visible range of the image capturing element is determined based on an angle of view. In some aspects, the image capturing element is, for example, a camera, a video camera, a photographing module integrated with an optical system or a CCD chip, or a photographing module integrated with an optical system and a CMOS chip. The image capturing element may be integrated in the capturing device 202, or may be disposed independently of the capturing device 202. For example, the image capturing element may be provided externally to the capturing device 202 and be communicatively connected in a wired or wireless manner.

In some aspects, the capturing device 202 may further include a display element. The display element is configured to provide an interface for the target object to view the virtual character. In some aspects, the display element is, for example, a liquid crystal display or a projector. The display element may be integrated in the capturing device 202, or may be disposed independently of the capturing device 202. For example, the display element may be provided externally to the capturing device 202 and be communicatively connected in a wired or wireless manner.

For example, the capturing device 202 may alternatively be, but is not limited to, various desktop computers, notebook computers, smartphones, tablets, Internet of Things devices, or portable wearable devices. The Internet of Things devices may be smart speakers, smart televisions, smart air conditioners, smart in-vehicle devices, or the like. The portable wearable devices may be, e.g., smartwatches, smart bracelets, or head-mounted devices. In some aspects, the capturing device 202 may alternatively be an electronic device having a payment function.

The server 204 may be an independent physical server, or a server cluster or a distributed system including a plurality of physical servers, or may alternatively be a cloud server providing basic cloud computing services such as cloud services, cloud databases, cloud computing, cloud functions, cloud storage, network services, cloud communications, middleware services, domain name services, security services, content delivery networks (CDNs), or big data and artificial intelligence platforms.

In some aspects, the capturing device 202 may be loaded with an application (APP) or an application with a virtual character display function, including a traditional application that to be installed separately, or an applet application that may be used without being downloaded and installed.

The application may be one or more applications having a social function, an instant messaging function, a payment function, or the like.

Figure 3:
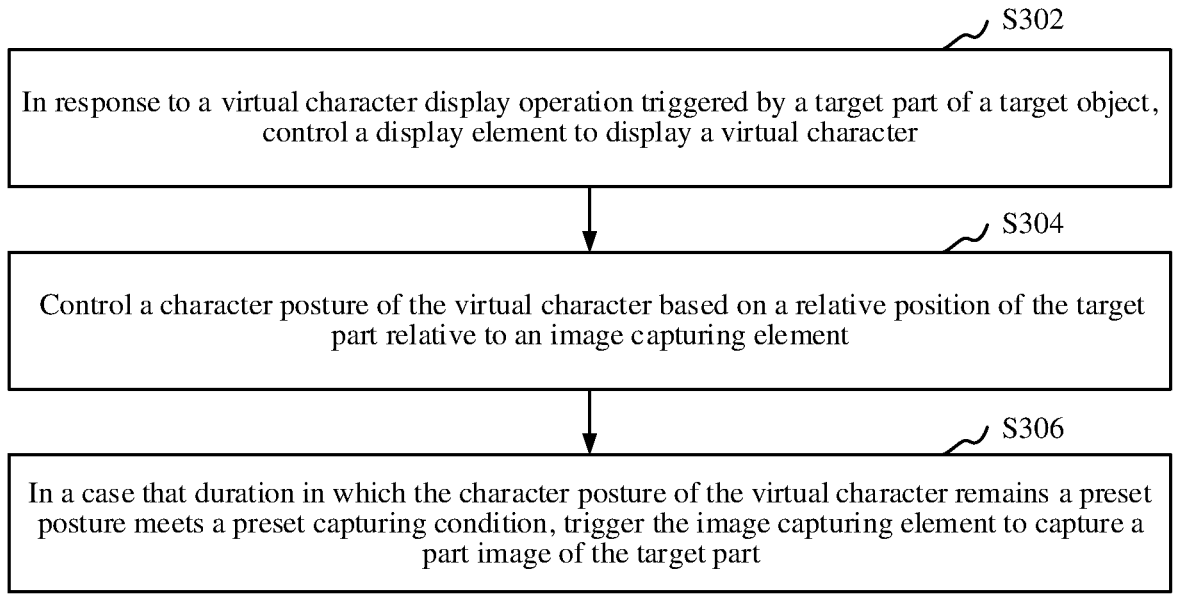
FIG. 3 is a schematic flowchart of an image capturing method according to some illustrative aspects.

In some aspects, as shown in FIG. 3, a method of performing authentication on a creature is provided. The method may be performed by a capturing device alone or together with a server. The following uses an example in which the method is applied to a capturing device in FIG. 2 for description. The capturing device includes an image capturing element and a display element. The method includes the following operations:

operation S302: In response to a virtual character display operation triggered by a target part of a target object, control a display element to display a virtual character.

The target object is an object of a specified type, for example, the target object may be specified to be a person, an animal, or the like. The target part is a part on the target object specified in advance, including but not limited to one or more of the face, palm, or finger of the target object.

The virtual character display operation is an operation for triggering display of the virtual character by the display element of the capturing device. For example, when the target part is within a visible range of the image capturing element, it may be considered that the target part of the target object triggers the virtual character display operation; or when duration in which the target part stays within the visible range of the image capturing element exceeds a specific threshold, it may be considered that the target part of the target object triggers the virtual character display operation.

In some aspects, the virtual character display operation may be triggered when the image capturing element detects the target part within its visible range, in other words, the target part is within the visible range of the image capturing element. For example, the image capturing element may be in an operating state or a dormant state, and after the image capturing element is awakened to start capturing images, the image capturing element may detect images of various objects. Until the image capturing element detects the target part of the target object, it is determined that the target part triggers the virtual character display operation, and the display element displays the virtual character. In other words, although the image capturing element detects other objects, the virtual character display operation is not triggered, thereby ensuring that the virtual character display operation is triggered only by the target object using the target part, and improving safety of a subsequent capturing process. For example, when the target object reaches out the hand and passes over the image capturing element, the image capturing element may detect an image of an object such as a watch on the wrist, and the virtual character display operation is not triggered in this case. The display element is triggered to display the virtual character only when the target object places the palm within the visible range of the image capturing element. In this process, the wrist of the target object is a non-target part, while the palm of the target object is the target part.

In some aspects, to avoid false triggering caused by an action of the target object, after detecting the target part, the image capturing element determines, only when duration in which the target part stays within the visible range of the image capturing element is not less than preset duration, that the target part triggers the virtual character display operation. In other words, the image capturing element determines, when continuously detecting an image of the target part for the preset duration, that the target part triggers the virtual character display operation. In this way, a phenomenon of false triggering caused due to the target part stays within the visible range for short time is avoided, and it is ensured that the target object has an image capturing intention.

When the target object triggers the image capturing element to perform the virtual character display operation through the target part, the capturing device displays a preset virtual character by using the display element. The virtual character is concrete display of the target part of the target object in the interface displayed by the display element. The virtual character may be an animal, a virtual mini person, an anthropomorphic image, or the like. The virtual character may be a two-dimensional or three-dimensional virtual character. For example, when the target object is, for example, a person, the target part is, for example, a palm of the person, and correspondingly, the capturing device displays a virtual mini person as concrete display of the palm. A character posture of the virtual character can reflect a status of the target part.

To meet a quality requirement on the image captured by the image capturing element, it is usually necessary for the target part to maintain in a standard state for specific duration. During this period, the image capturing element captures an image of the target part, and the captured image is a part image of the target part. When the target part offsets from the standard state, the captured image may be inaccurate. In some aspects, whether the target part is in the standard state is generally determined based on a relative position of the target part relative to the image capturing element.

The character posture of the virtual character is related to the relative position of the target part relative to the image capturing element.

In some aspects, the character posture of the virtual character may be represented by a movement of the virtual character. For example, the character posture of the virtual character may be represented by one or more of a body movement (such as a movement of the head, the limbs, or the torso), a movement state (such as static or moving), a movement type (such as squatting, walking, turning, or running), a movement speed (such as static, slow, or fast), or the like.

In other aspects, the character posture of the virtual character may alternatively be represented by a status of a virtual item controlled by the virtual character. The status of the virtual item includes but is not limited to one or more of a blur degree, a color, a movement status, or the like. For example, the virtual character controls the virtual item to move relative to the virtual character, and the status of the target part is reflected by the movement status of the virtual item. Alternatively, when the virtual character controls an appearance of the virtual item to change, the status of the target part is represented by a change status or a change speed of the appearance of the virtual item. For another example, the blur degree (namely, transparency) of the virtual item is used to represent the status of the target part. When the target part is far away from the image capturing element, the blur degree of the virtual item is high.

In still other aspects, the character posture of the virtual character may alternatively be comprehensively represented by the movement of the virtual character and the status of the virtual item controlled by the virtual character. For example, when the movement status of the virtual character changes, the status of the virtual item also changes at the same time, to comprehensively represent the change of the status of the target part.

That the character posture of the virtual character is related to the relative position of the target part relative to the image capturing element means that the character posture of the virtual character is affected by the relative position of the target part relative to the image capturing element.

In some aspects, that the character posture of the virtual character is related to the relative position of the target part relative to the image capturing element includes that the character posture of the virtual character has a mapping relationship with the relative position of the target part relative to the image capturing element. For example, the movement of the virtual character has a mapping relationship with the relative position of the target part relative to the image capturing element. For another example, the status of the virtual item controlled by the virtual character has a mapping relationship with the relative position of the target part relative to the image capturing element, or the like.

Operation S304: Control the character posture of the virtual character based on the relative position of the target part relative to the image capturing element.

In some aspects, the relative position of the target part relative to the image capturing element includes, but is not limited to, one or more of a spatial height of the target part relative to the image capturing element, a horizontal position of the target part relative to the image capturing element, or an inclined posture of the target part relative to the image capturing element. Therefore, the change of the target part relative to the standard status is represented by the change of the character posture of the virtual character, so that the user can intuitively learn and easily understand whether the status of the current target part is standard or not.

Specifically, the capturing device captures the relative position of the target part relative to the image capturing element, and controls the character posture of the virtual character based on the relative position of the target part relative to the image capturing element. The character posture of the virtual character changes with the change of the relative position of the target part relative to the image capturing element. In other words, in a case that the relative position of the target part relative to the image capturing element changes, a character posture of a currently displayed virtual character changes according to the change of the relative position. To intuitively feedback the current status of the target part in real time, in some aspects, when the relative position of the target part relative to the image capturing element changes, the character posture of the currently displayed virtual character changes in real time according to the change of the relative position. Therefore, the target object can be given an intuitive and clear perception, in other words, can have a clear cognition of the relative position of its own target part relative to the image capturing element. In this way, the target object can be quickly and directly guided to adjust the status of the target part, thereby facilitating the image capturing element to capture an appropriate part image more quickly.

For example, after controlling the display element to display the virtual character, the capturing device monitors the relative position of the target part relative to the image capturing element in real time, and adjusts the character posture of the virtual character in real time based on the relative position of the target part relative to the image capturing element. For example, after controlling the display element to display the virtual character, the capturing device monitors the relative distance of the target part relative to the image capturing element in real time by using a distance sensor, and adjusts the character posture of the virtual character in real time based on the relative distance, so that the character posture of the virtual character changes in real time according to the change of the relative position.

The spatial height of the target part relative to the image capturing element is usually a distance between the center of the target part and a plane on which the image capturing element is located. The plane on which the image capturing element is located is, for example, a plane on which an optical lens in the camera is located. The horizontal position of the target part relative to the image capturing element is an in-plane distance between a projection center of the target part mapped on the plane on which the image capturing element is located and the center of the image capturing element on the plane on which it is located. The center of the image capturing element on the plane on which it is located is, for example, the center of a camera or the like. The inclined posture of the target part relative to the image capturing element includes an inclination angle of the target part relative to the image capturing element and an inclination direction of the target part relative to the image capturing element. The inclination angle of the target part relative to the image capturing element is a plane angle between a plane on which the target part is located and the plane on which the image capturing element is located. The inclination direction of the target part relative to the image capturing element may be determined based on a positive or negative sign or a degree of the plane angle.

The horizontal position is a position of the target part in a plane parallel to the image capturing element is located. The horizontal position represents an orientation of the target part relative to the image capturing element. When the target part is facing the image capturing element, the horizontal position of the target part is a planar position at which the target part is located in the plane that the target part is facing. When the target part has a specific inclination angle relative to the image capturing element, the horizontal position of the target part is a position of its projection in the plane parallel to the image capturing element.

In some aspects, when the relative position of the target part relative to the image capturing element changes, for example, when the target part is excessively high or excessively low from the image capturing element, the capturing device controls the display element to display the virtual character in a manner such as raising or lowering the upper limb, standing up, squatting, or the like, to represent the height of the target part by using the change of the limb movement. For another example, the spatial height of the target part relative to the image capturing element may be represented by using the change of the movement speed of the virtual character. For example, the target part being excessively high or excessively low may be represented by using movement, and when the height is appropriate, the virtual character remains stationary, or the like.

In some aspects, when the relative position of the target part relative to the image capturing element changes, for example, when the target part is excessively high or excessively low from the image capturing element, the capturing device controls the display element to display the virtual character controlling the virtual item to move upward and downward, to intuitively represent the change in the height. For another example, when the target part is inclined relative to the image capturing element, the virtual item controlled by the virtual character displayed by the display element controlled by the capturing device is also inclined accordingly, and an inclination angle has a specific mapping relationship with the inclination angle of the target part relative to the image capturing element, thereby intuitively representing the inclined state of the target part.

To avoid a problem of inconvenient operation caused by excessive sensitivity, in some aspects, there is an allowable range for a change amount of the relative position of the target part relative to the image capturing element. In a case that the change amount of the relative position is within the allowable range, it may be considered that the relative position of the target part relative to the image capturing element remains unchanged. Correspondingly, the character posture of the virtual character displayed by the display element does not change.

For another example, in other aspects, in a case that the change amount of the relative position is within the allowable range, although the relative position of the target part relative to the image capturing element changes, the character posture of the virtual character displayed by the display element controlled by the capturing device does not change.

In some aspects, in a case that the relative position of the target part relative to the image capturing element does not change, the character posture of the virtual character displayed by the display element controlled by the capturing device also remains unchanged.

Operation S306: In a case that duration in which the character posture of the virtual character remains a preset posture satisfies a preset capturing condition, trigger the image capturing element to capture a part image of the target part in air.

In-air capture means non-contact or contactless image capture. Non-contact image capture means that the target part of the target object and the image capturing element do not contact. In-air capture is performed by the image capturing element of the capturing device. A purpose of the in-air capture is to capture the part image of the target part of the target object. In other words, in-air capture means that the image of the target part is captured by the image capturing element in a case that the image capturing element and the target part of the target object do not contact.

In general, after the target object triggers awakening of the image capturing element by using its target part, the capturing device controls the character posture of the virtual character displayed by the display element to guide the target object to adjust a position of the target part relative to the image capturing element, and then the image capturing element captures the part image of the target part. Subsequently, further biometric authentication may be performed by using the part image. Biometric authentication means identity authentication on the target object. For example, the captured image may be uploaded to a server for storage as a biometric authentication template of the target object. When the target object needs to perform biometric authentication subsequently, the server can compare an image captured in real time with the biometric authentication template captured and stored in advance, to determine identity legitimacy of the target object.

In a scenario of in-air capture, because the relative position of the target part relative to the image capturing element is uncontrollable and may change at any time, the capture process requires the target part to be at a correct position, or maintain at the correct position for specific duration. For example, the spatial height of the target part from the image capturing element needs to be appropriate, and the spatial height being excessively high or excessively low causes the captured part image to be blurred, unclear, or incomplete. For another example, the target part needs to be within a capture range of the image capturing element, and if the offset is excessively large, the captured part image is incomplete or distorted, which eventually leads to an inaccurate image capture result. The capture range is within a visible range of the image capturing element.

Therefore, to guide the target object to adjust the relative position of the target part relative to the image capturing element, and give direct and clear feedback to the target object, a standard character posture, namely, the preset posture, may be preset. When the target object controls the target part to be in an appropriate status, the capturing device displays the virtual character being in the preset posture. In some aspects, when the character posture of the virtual character includes a status of the virtual item, the preset posture includes that the virtual character is in the preset posture and the virtual item is in a preset standard item posture.

For example, the preset posture of the virtual character is that the virtual character runs at a specific constant speed on a fixed track, and when the target part is excessively high or excessively low from the image capturing element, the speed of the virtual character of the virtual character becomes lower or higher; when the horizontal position of the target part is near the left side or the right side (the upper side or the lower side) from the image capturing element, a position of the virtual character relative to the track offsets (for example, the virtual character runs to the left or runs to the right); when the target part is inclined, the virtual character is also inclined accordingly; or the like.

For another example, the preset posture of the virtual character is that the virtual character controls the virtual item to move forward at a stable and constant speed, and when the target part is excessively high or excessively low from the image capturing element, the virtual character controls the virtual item to move upward or downward; when the target part is near the left side or the right side (the upper side or the lower side) from the horizontal position of the image capturing element, the virtual character controls the virtual item to be inclined to the left or to the right; or the like.

The preset capturing condition includes but is not limited to one or more of the following: duration in which the character posture of the virtual character remains the preset posture exceeds a threshold, duration in which the character posture of the virtual character remains the preset posture changes regularly, or duration in which the character posture of the virtual character remains the preset posture reaches a threshold for a plurality of times. For example, when the duration in which the character posture of the virtual character remains the preset posture exceeds 5 seconds, the capturing device controls the image capturing element to capture the part image of the target part. For another example, when the duration in which the character posture of the virtual character remains the preset posture exceeds 3 seconds, and then exceeds 5 seconds, the capturing device controls the image capturing element to capture the part image of the target part.

In other words, when the target part is in a state suitable for image capture, the displayed character posture of the virtual character is the preset posture, to prompt the target object to keep the target part static; and when duration in which the target part is in the state exceeds a threshold, and the preset capturing condition is met, the capturing device triggers the image capturing element to capture the part image of the target part.

In some aspects, in a case that duration in which the character posture of the virtual character remains a preset posture satisfies the preset capturing condition, the capturing device controls the image capturing element to capture the part image of the target part for a plurality of frames, to improve accuracy and integrity of image capture. A plurality of frames includes two or more frames.

In some aspects, in a case that the duration in which the character posture of the virtual character remains the preset posture does not meet the preset capturing condition, the capturing device controls the display element to prompt the target object to keep the target part static, so that the duration in which the character posture of the virtual character remains the preset posture meets the preset capturing condition, thereby triggering the image capturing element to capture the part image of the target part.

In the foregoing image capturing method, image capture is performed in the manner of in-air capture, which breaks the rigid demand on hardware infrastructure. In response to the virtual character display operation triggered by the target part of the target object, the relative position of the target part relative to the image capturing element is displayed in a visualized and concrete manner by using the character posture of the virtual character. The change of the character posture of the virtual character is represented by the change of the target part relative to the standard posture, so that it is more vivid. In a case that the relative position of the target part relative to the image capturing element changes, the character posture of the currently displayed virtual character changes according to the change of the relative position, so that a user can learn whether the status of the current target part is standard in a very intuitive and easy-to-understand manner. In a case that the duration in which the character posture of the virtual character remains the preset posture meets the preset capturing condition, the image capturing element is triggered to perform capture, which greatly improves capturing efficiency and ensures an accuracy of the captured image.

In this aspect of this application, that the relative position of the target part of the target object relative to the image capturing element affects the character posture of the virtual character may be used as a mini game to provide the user with immersive capturing experience in the form of the mini game. This can efficiently complete image capture of the target part when the user is immersed in the mini game and has no perception of the actual capturing process, and has better experience. In the whole process, the virtual character is in a dynamic posture (being static may also be considered as a specific dynamic posture, or the virtual character may also move in local actions such as limbs while maintaining overall static), and has strong interaction with the user. This can improve the interest of the image capturing process, and the user has no perception on the capturing process of the image capturing element.

In some aspects, the method further includes: transmitting the captured part image of the target part to a server, the part image being configured for indicating the server to store the part image in association with the target object for biometric authentication of the target object based on the associatively stored part image when the target part of the target object triggers the authentication operation.

Specifically, after the capturing device controls the image capturing element to capture one or more frames of part image of the target part, the part image of one or more frames are transmitted to the server, and the server stores the part image of one or more frames in association with the target object. For example, the server creates a storage space corresponding to each target object and indexes identification information of the target object (for example, a created account or a nickname) for ease of lookup. A part image of each target object is stored in a respective storage space of the target object.

In the subsequent process of biometric authentication, for example, the server may match the part image captured in real time with the part image that has been stored in advance, to determine legitimacy of the target object and obtain a biometric authentication result. For example, when determining that the part image captured in real time matches the part image stored in advance, the server determines that the target object is legitimate. That the part image captured in real time matches the part image stored in advance may be that a similarity of the two images exceeds a preset threshold, or the like.

In the foregoing aspect, by storing the captured part image in association with the target object, the stored part image can be used as the basis for subsequent identity verification or biometric authentication of the target object in various scenarios. In a case that a subsequent part image captured in real time does not match the part image of the target object stored in advance, or in a case that the part image associated with the target object cannot be found, the verification of the target object fails, thereby ensuring privacy security of the target object.

To further ensure the privacy security of the target object, and prevent others from impersonating the target object to tamper with biological information of the target object, in some aspects, before the in response to a virtual character display operation triggered by a target part of a target object, displaying a virtual character, the method further includes: performing target detection and liveness detection on a target appearing within the capture range of the image capturing element; and in a case that it is detected that the target is the target part of the target object and a living body is detected, determine that the target part of the target object triggers an authentication operation.

Specifically, the capturing device performs target detection on the target appearing within the capture range of the image capturing element, to ensure that an object triggering the virtual character display operation is the target part of the target object, not other objects, or other parts of the target object. In addition, the capturing device performs liveness detection on the target appearing within the capture range of the image capturing element, to determine that the currently detected target part has vital signs, but is not a photo, a statue, or the like.

For example, the capturing device is further provided with an infrared sensor. The infrared sensor is configured to: perform detection on the target appearing within the capture range of the image capturing element, and detect whether the target has a vein feature. The vein feature is an image feature of a vein texture in the image. In a case that the vein feature is detected, the capturing device determines that the currently detected target passes the liveness detection. On the contrary, in a case that the vein feature is not detected, the capturing device determines that the currently monitored target fails the liveness detection, and therefore, may refuse to perform the virtual character display operation. Therefore, it is possible to prevent an object other than the target object from impersonating the target object by using a photo of the target part of the target object without the target object knowing, thereby ensuring the privacy security and resource security of the target object.

In the foregoing aspect, by performing the target detection and liveness detection before determining to trigger the virtual character display operation, the privacy security of the target object can be protected under the premise of secure biometric authentication.

As described above, when the target part is in a state suitable for image capturing, it is necessary to prompt the target object to keep the target part static, so that the image capturing element can perform image capture on the target part. Therefore, the method further includes: in a case that the relative position of the target part relative to the image capturing element is within a preset position range, displaying a movement animation in which the virtual character performs a first movement in a preset posture; and output first prompt information, the first prompt information being configured for indicating the target object to maintain a state in which the target part and the image capturing element are relative static, to cause the character posture of the virtual character to remain the preset posture.

The preset position range is configured for indicating that when the position of the target part is within the range, the target part is in a state suitable for image capture. The preset position range is a position range that is preset, such as a preset spatial height range or a preset horizontal distance range. For example, if the preset position range is 10 cm to 15 cm away from the image capturing element, when the distance between the target part and the image capturing element is within 10 cm to 15 cm, the target part is within the preset position range.

The relative static state means that the relative position of the target part relative to the image capturing element remains unchanged, or when a change degree of the relative position of the target part relative to the image capturing element is within an allowable range, it may also be considered as that the target part and the image capturing element are in the relative static state.

The first prompt information is configured for prompting the target object to keep the target part in the current state unchanged. In an actual scenario, when the target object keeps the target part in the current state, it may be considered as that the target object keeps the target part in the current state unchanged. The first movement is a standard movement of the virtual character when the target part satisfies a relative static state. Movement types of the first movement include but are not limited to one or more of walking, running, circling, flying, or being static.

Specifically, when the relative position of the target part relative to the image capturing element is within the preset position range, the capturing device is triggered to output the first prompt information, to prompt the target object to maintain the current state of the target part, thereby controlling the target part and the image capturing element to remain in the relative static state. Correspondingly, during a period in which the target object controls the target part to remain in the relative static state with the image capturing element, the character posture of the virtual character also remains the preset posture, thereby providing a vivid status feedback.

The capturing device may display the first prompt information in a form of words, patterns, animations, or the like in the display interface by using the display element. For another example, the capturing device may play the first prompt information in a form of voice, music, or the like by using a sound playing element such as a speaker. The sound playing element may be integrated in the capturing device, or may be arranged independently of the capturing device. For example, the sound playing element may be connected to the capturing device through an external connection.

For example, in a case that the relative position of the target part relative to the image capturing element is within the preset position range, the capturing device controls the display element to display a movement animation in which the virtual character runs at a specific constant speed, to indicate that the target part is within the preset position range. In addition, the capturing device controls a slogan on the display interface as the first prompt information, to prompt the target object to keep the target part in the relative static state with the image capturing element.

For another example, in a case that the relative position of the target part relative to the image capturing element is within the preset position range, the capturing device controls the display element to display a movement animation in which the virtual character holds a rod and moves forward at a constant speed on a tightrope, to indicate that the target part is within the preset position range.

Figure 4A:
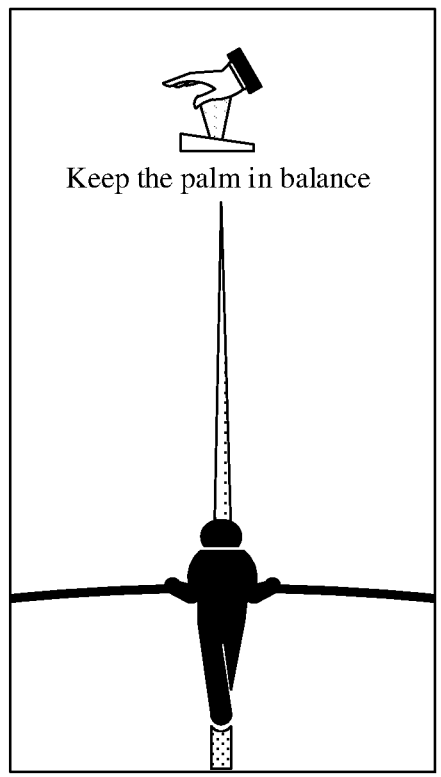
FIG. 4A is a schematic diagram of a posture of a virtual character according to some illustrative aspects.
Figure 4B:
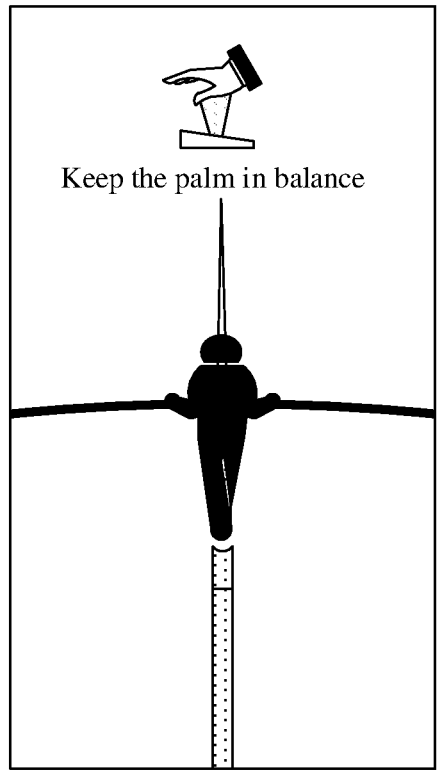
FIG. 4B is a schematic diagram of a posture of a virtual character according to some illustrative aspects.

For example, when the spatial height of the target part relative to the image capturing element changes, the capturing device controls the display element to display an interface, as shown in FIG. 4A, in which the virtual character (a mini character) controls the virtual item (a rod) to maintain a normal height, and the virtual character is in a state of walking forward normally. Correspondingly, the display element displays a movement animation in which the virtual character controls the virtual item to maintain a horizontal state and walks forward normally. When the target part is held in a preset height range for a period of time, the display element may further display an interface as shown in FIG. 4B. It can be seen that the virtual character controls the virtual item to maintain the horizontal state and normally walks forward for a specific distance.

In addition, using the palm as an example, the display element may alternatively display first prompt information of "keep your palm in balance" as shown in FIG. 4A and FIG. 4B, to prompt the target object to keep the palm in the relative static state with the image capturing element.

In the foregoing aspect, the first prompt information is outputted in combination with the movement animation in which the virtual character performs the first movement, it is timely and clearly fed back to the target object that the state of the target part satisfies the preset capturing condition, and the target part is prevented from moving again, thereby improving the completion rate and the capturing efficiency.

In a case that the relative position of the target part relative to the image capturing element changes, the currently displayed character posture of the virtual character changes according to the change of the relative position. According to an aspect, the virtual character may reflect, through a movement animation of a specific movement, whether the height of the target part relative to the image capturing element is excessively high or excessively low relative to the standard height.

In addition, to distinguish the specific movement from the first movement that meets the preset capturing condition, in some aspects, that in a case that the relative position of the target part relative to the image capturing element changes, the currently displayed character posture of the virtual character changes according to the change of the relative position includes: in a case that the spatial height of the target part relative to the image capturing element changes, displaying a movement animation in which the virtual character performs a second movement, the character posture of the virtual character during the second movement changing according to the change of the spatial height.

The second movement is a movement of the virtual character when the target part does not satisfy a relative static state. Movement types of the second movement include but are not limited to one or more of walking, running, squatting, circling, flying, or being static.

Specifically, when the spatial height of the target part relative to the image capturing element changes, the capturing device controls the display element to display a movement animation in which the virtual character performs a second movement, and during the second movement of the virtual character, when the spatial height changes, the character posture of the virtual character also changes accordingly. In other words, the virtual character performs the second movement to represent the spatial height of the target part in the actual physical space. When the spatial height changes, the virtual character still performs the second movement, but the specific character posture is different during the second movement, for example, the posture of the virtual character may change, the posture of the virtual item controlled by the virtual character may change, or the postures of both the virtual character and the virtual item controlled by the virtual character may change.

Figure 5A:
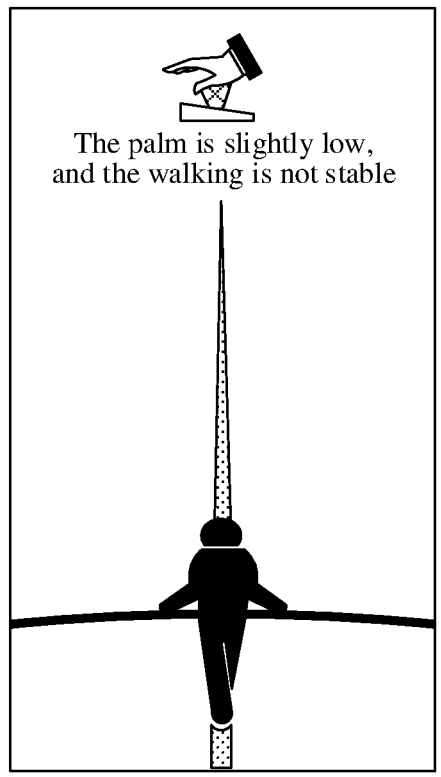
FIG. 5A is a schematic diagram of a virtual character in an abnormal posture according to some illustrative aspects.

For example, when the spatial height of the target part relative to the image capturing element is excessively low, as shown in FIG. 5A, the virtual character may be displayed in a posture of walking unstably, such as a posture in which a walking speed changes. In addition, the virtual character controls the virtual item to be at a height that is low relative to the virtual character.

Figure 5B:
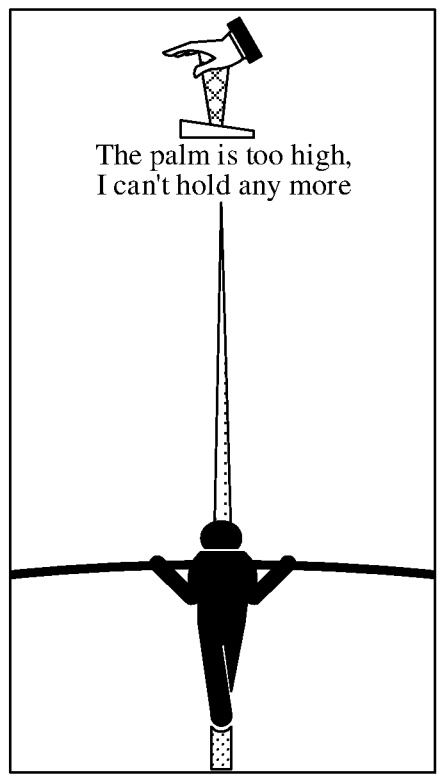
FIG. 5B is a schematic diagram of a virtual character in an abnormal posture according to other illustrative aspects.

When the spatial height of the target part relative to the image capturing element is excessively high, as shown in FIG. 5B, the virtual character may be displayed in a posture of walking unstably, and the virtual character controls the virtual item to be at a height that is high relative to the virtual character.

When the spatial height of the target part relative to the image capturing element is within the preset height range, as shown in FIG. 4A and FIG. 4B, the virtual character is displayed in the posture of walking forward normally, and the virtual character controls the virtual item to be at a normal height relative to the virtual character.

In the foregoing aspect, the change of the spatial height of the target part is represented by the movement animation in which the virtual character performs the movement, and the target object can be vividly prompted with the status of the current spatial height of the target part. This is convenient for the target object to adjust the spatial height of the target part, and improves the capturing efficiency.

To give the target object a clearer hint to prompt the target object to adjust the spatial height of the target part, in some aspects, in a case that the spatial height of the target part relative to the image capturing element is not within the preset height range, second prompt information is outputted when the movement animation in which the virtual character performs the second movement is displayed. The second prompt information is configured for indicating the target object to adjust the spatial height of the target part relative to the image capturing element.

Specifically, in a case that the spatial height of the target part relative to the image capturing element is not within the preset height range, the capturing device may display the second prompt information in a form of words, patterns, animations, or the like in the display interface by using the display element. For another example, the capturing device may display the second prompt information in a form of voice, music, or the like by using a sound playing element such as a speaker.

For example, as shown in FIG. 5A, the target part is the palm. When the spatial height of the target part relative to the image capturing element is excessively low, a second prompt message of "the palm is slightly low, and the walking is not stable" is further displayed in the display interface. Still as shown in FIG. 5B, when the spatial height of the target part relative to the image capturing element is excessively high, a second prompt message of "the palm is too high, I can't hold any more" is further displayed in the display interface.

In the foregoing aspect, the second prompt information is outputted in combination with the movement animation in which the virtual character performs the second movement, it is timely and clearly fed back to the target object that the spatial height of the target part is not within the preset height range, to help the target object to adjust the spatial height of the target part.

In some aspects, the second movement includes a vertical movement, and the in a case that the spatial height of the target part relative to the image capturing element changes, displaying a movement animation in which the virtual character performs a second movement includes: in a case that the spatial height of the target part relative to the image capturing element changes, displaying the virtual character controlling a virtual item to perform a vertical movement. A direction of the vertical movement of the virtual item and a distance between the virtual item and the virtual character correspond to the spatial height of the target part relative to the image capturing element.

Specifically, in a case that the spatial height of the target part relative to the image capturing element changes, the capturing device controls the display element to display the virtual character controlling the virtual item to perform the vertical movement, for example, the virtual character controlling the virtual item to perform upward and downward movement relative to the virtual character, or the virtual character controlling the virtual item to offset in a vertical direction relative to a normal position of the virtual item. The normal position of the virtual item is a position at which the target part is located when the target part is within the preset height range.

The direction of the vertical movement of the virtual item has a correspondence with the spatial height of the target part relative to the image capturing element. In some aspects, that the direction of the vertical movement of the virtual item has a correspondence with the spatial height of the target part relative to the image capturing element includes: the direction of the vertical movement of the virtual item has a correspondence with a difference between the spatial height and the preset height range. For example, the direction of the vertical movement of the virtual item may be proportional, or inversely proportional to the difference.

In some aspects, the in a case that the spatial height of the target part relative to the image capturing element changes, displaying the virtual character controlling a virtual item to perform a vertical movement includes: in a case that the spatial height of the target part relative to the image capturing element becomes higher, displaying the virtual character controlling the virtual item to perform a vertical upward movement; and in a case that the spatial height of the target part relative to the image capturing element becomes lower, displaying the virtual character controlling the virtual item to perform a vertical downward movement. Specifically, when the spatial height of the target part relative to the image capturing element becomes higher, the capturing device controls the display element to display a movement animation in which the virtual character controls the virtual item to perform the vertical upward movement, and conversely, when the spatial height of the target part relative to the image capturing element becomes lower, the capturing device controls the display element to display a movement animation in which the virtual character controls the virtual item to perform the vertical downward movement.

For example, when the target part is lower than the preset height range, the capturing device controls the display element to display the vertical downward movement of the virtual item; or when the target part is higher than the preset height range, the capturing device controls the display element to display the vertical upward movement of the virtual item.

The distance between the virtual item and the virtual character also has a correspondence with the spatial height of the target part relative to the image capturing element. In some aspects, that the distance between the virtual item and the virtual character also has a correspondence with the spatial height of the target part relative to the image capturing element includes: the distance between the virtual item and the virtual character in the vertical direction is proportional to the difference between the spatial height and the preset height range. For example, when the spatial height is lower than the preset height range, the virtual item moves downward vertically, and the lower the spatial height, the farther the virtual item moves downward from the virtual character in the vertical direction.

For example, as shown in a comparison between FIG. 4A and FIG. 5A, the virtual character controls the virtual item to perform the downward movement, to visually represent that the spatial height of the target part relative to the image capturing element is excessively low. As shown in a comparison between FIG. 4A and FIG. 5B, the virtual character controls the virtual item to perform the upward movement, to visually represent that the spatial height of the target part relative to the image capturing element is excessively high.

In the foregoing aspect, the change of the virtual item is kept in the same direction as the change of the target part, and an amplitude of the movement is proportional to the change amount of the spatial height, which is in line with the general law and general cognition, and can intuitively reflect the relationship between the spatial height of the target part and the preset height range. This can quickly help the target object to adjust the spatial height of the target part, to ensure that the target part is at an appropriate height relative to the image capturing element, thereby improving the capturing efficiency.

In some aspects, the in a case that the spatial height of the target part relative to the image capturing element changes, displaying the virtual character controlling a virtual item to perform a vertical movement includes: in a case that the spatial height of the target part relative to the image capturing element changes, determining a current spatial height of the target part relative to the image capturing element; determining a height difference between the spatial height and a preset height; mapping the height difference to a relative distance between the virtual item and the virtual character based on a preset distance mapping relationship, a large height difference indicating a large relative distance; controlling the virtual character to operate the virtual item to perform a vertical movement based on the relative position.

Specifically, the capturing device controls the image capturing element to detect the current spatial height of the target part relative to the image capturing element, compares the spatial height captured in real time with the preset height, calculates the height difference between the two, maps the height difference to the relative distance between the virtual item and the virtual character through a preset distance mapping relationship, and is reflected in the process of the virtual character controlling the movement of the virtual item. To be specific, the capturing device controls the display element to display the virtual character to operate the virtual item to perform the vertical movement, to move the virtual item to a position, the relative position between the position and the standard position having a numerical mapping relationship with the height difference. For example, the greater the relative distance between the original position of the virtual item and the position after the vertical movement, the greater the height difference between the target part and the image capturing element.

In the foregoing aspect, the virtual item moves in the same direction, and the amplitude of the movement is proportional to the change amount of the spatial height, which is in line with the general law and general cognition, and can intuitively reflect the relationship between the spatial height of the target part and the preset height range. This can quickly help the target object to adjust the spatial height of the target part, thereby improving the capturing efficiency.

In some aspects, the capturing device may obtain the spatial height of the target part relative to the image capturing element based on a captured image. For example, the capturing device may calculate the spatial height of the target part relative to the image capturing element based on a mapping relationship between a size of a key area in the captured target part and the spatial height. The key area is an area carrying key information in the target part, and the key information may be used for image recognition, data analysis, or the like. Using the hand as an example, the palm area is the key area, and other areas such as fingers and wrists are non-key areas.

In other aspects, a plurality of distance sensors are deployed around the image capturing element. When the target part is placed within the visible range of the image capturing element, the capturing device may detect the spatial height of the target part relative to the image capturing element by using the distance sensors. Correspondingly, in some aspects, the determining a current spatial height of the target part relative to the image capturing element includes: in a case that the target part is within a capture range of the image capturing element, capturing a plurality of effective distances corresponding to a key area of the target part using the plurality of distance sensors; and determining the current spatial height of the target part relative to the image capturing element based on the plurality of effective distances.

A quantity of distance sensors may be set according to actual needs, and the distance sensors may be symmetrically distributed. The distance sensor may be, for example, a sensor using a time of flight (ToF) technology. In a case that no object is detected by the distance sensor, or a distance between the object and the distance sensor exceeds a detectable range, the distance sensor outputs a specific value. When the distance sensor detects an object within its detectable range, the distance sensor outputs the distance value.

Usually, the target part blocks at least one distance sensor, and the capturing device performs calculation based on at least one respective distance detected and outputted by the at least one distance sensor, to obtain a final distance. The final distance is the current spatial height of the target part relative to the image capturing element.

Specifically, in a case that the target part is within the capturing range of the image capturing element, the target part is within the detectable range of one or more distance sensors, to be specific, a projection area in which a key area of the target part is projected to a plane on which the distance sensor is located covers one or more distance sensors. In this case, the capturing device captures a plurality of effective distances corresponding to the key area of the target part by using the one or more distance sensors. Remaining distance sensors that have not detected the target part output invalid distance values. Therefore, the capturing device can determine the current spatial height of the target part relative to the image capturing element based on a plurality of effective distances. For example, the capturing device uses an average value of the plurality of effective distances as the current spatial height of the target part relative to the image capturing element.

Figure 6A:
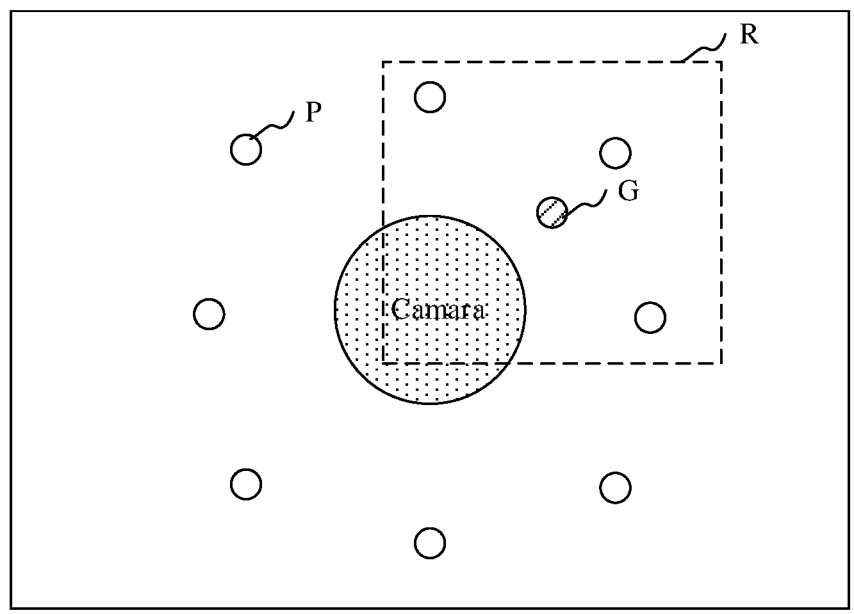
FIG. 6A is a schematic diagram of a distance sensor arrangement according to some illustrative aspects.

For example, as shown in FIG. 6A, a plurality of distance sensors P are disposed around a camera of the image capturing element. According to a range covered by a key area R of the target part, the capturing device determines distance sensors corresponding to the range, in other words, distance sensors blocked by the target part, and obtains a current spatial height of the target part relative to the image capturing element based on distance values outputted by the distance sensors.

In an actual scenario, because there may be a phenomenon such as block of an arm, each of a plurality of distance sensors returns a distance value, but only some of the distance values are distance values corresponding to the target part, and the remaining distance values may be detected distance values from the arm due to the block of the arm, which further leads to an inaccurate result of distance detection.

Therefore, in some aspects, the disposed distance sensors may be divided into quadrants, and there are a plurality of distance sensors in each quadrant. In this way, the capturing device determines a key area center G according to the key area of the target part detected by the image capturing element, captures, based on a quadrant in which the key area center G is located, a plurality of distance values outputted by a plurality of distance sensors in the quadrant, and determines the current spatial height of the target part relative to the image capturing element based on the plurality of distance values.

Figure 6B:
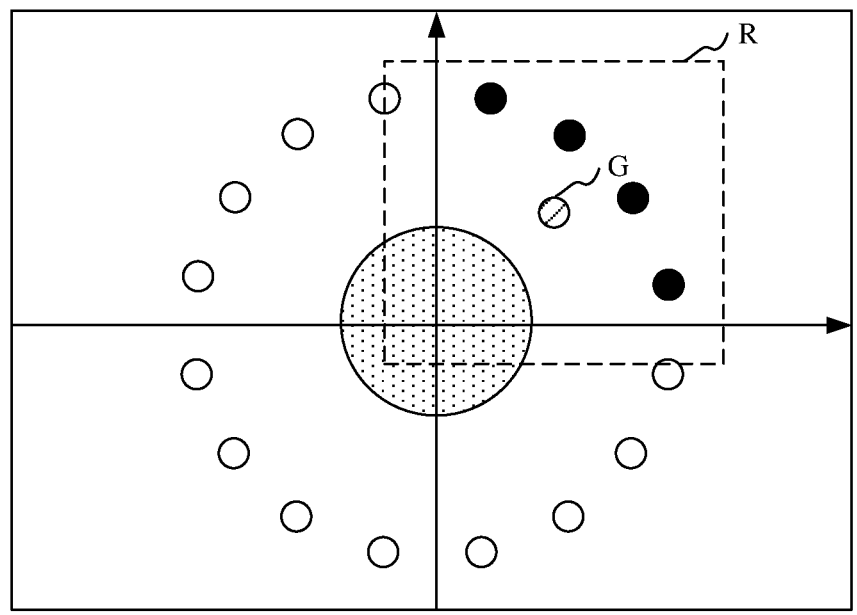
FIG. 6B is a schematic diagram of a distance sensor arrangement according to some illustrative aspects.

As shown in FIG. 6B, the capturing device determines, based on the key area R of the target part detected by the image capturing element, that the quadrant in which the key area center G is located is the first quadrant, and therefore, determines distance sensors in the first quadrant (shown in black circles in the figure to be distinguished from other sensors), and obtains distance values outputted by these sensors.

Therefore, by setting the plurality of distance sensors around the camera for detection, the spatial height of the target part relative to the image capturing element can be more accurately obtained, and a size of a presented mapping pattern can be more accurate, so that the target object can adjust the spatial height of the target part more quickly and accurately.

According to another aspect, in a case that the horizontal position of the target part relative to the image capturing element changes, a movement animation in which the virtual character performs a third movement is displayed, the character posture of the virtual character during the third movement changing according to the change of the horizontal position.

The third movement is also a movement of the virtual character when the target part does not satisfy a relative static state. Movement types of the third movement include but are not limited to one or more of walking, running, squatting, circling, flying, or being static.

Both the second movement and the third movement are different from the first movement, and the third movement is different from the second movement. In other words, to make the character posture of the virtual character clearly represent the status of the target part, to distinguish changes of the target part in two dimensions of spatial height and horizontal position, the second movement and the third movement are different types of movement, or movement modes of a same type of movement in different dimensions. For example, the second movement may be jump upward and downward, and the third movement may be inclined to the left and the right, or the like. For another example, the virtual character is in a movement state of flying (for example, the virtual character is an airplane, a bird, or a mini virtual character carrying an air vehicle), and when a spatial height changes, a flying position of the virtual character is deviated to the upper side or the lower side; when a horizontal position changes, a flying position of the virtual character is deviated to the left side or the right side; when the target part is inclined, a flying position of the virtual character is also inclined; or the like.

Specifically, in a case that the horizontal position of the target part relative to the image capturing element changes, the capturing device controls the display element to display a movement animation in which the virtual character performs a third movement, and when the horizontal position changes during the third movement of the virtual character, the character posture of the virtual character also changes. In other words, the virtual character performs the third movement to represent the horizontal position of the target part in the actual physical space. When the horizontal position changes, the virtual character still performs the third movement, but the specific character posture is different during the third movement, for example, the posture of the virtual character may change, the posture of the virtual item controlled by the virtual character may change, or the postures of both the virtual character and the virtual item controlled by the virtual character may change.

Figure 7A:
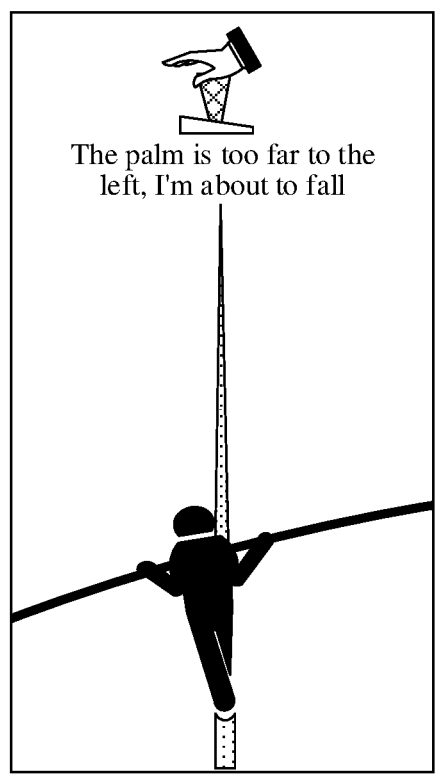
FIG. 7A is a schematic diagram of a virtual character in an abnormal posture according to some illustrative aspects.
Figure 7B:
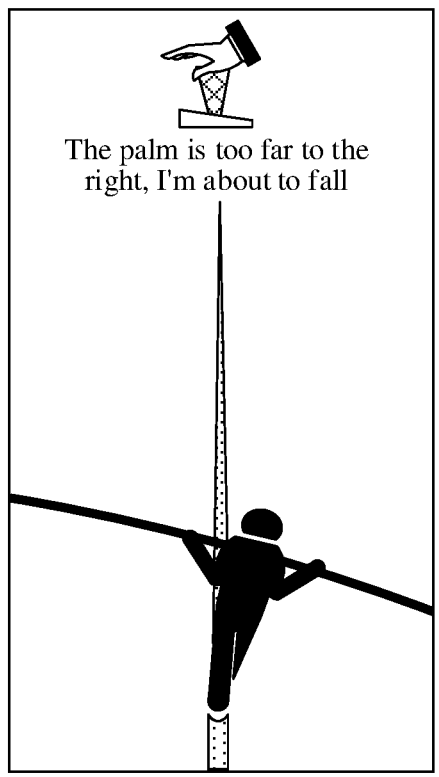
FIG. 7B is a schematic diagram of a virtual character in an abnormal posture according to some illustrative aspects.

For example, when the target part is near the left relative to the horizontal position of the image capturing element, as shown in FIG. 7A, the virtual character (the mini character) is displayed as leaning to the left. On the contrary, when the target part is near the right relative to the horizontal position of the image capturing element, as shown in FIG. 7B, the virtual character is displayed as leaning to the right.

When the target part is within a preset horizontal range relative to the horizontal position of the image capturing element, the virtual character displays a state in which the body is normally not offset, that is, the posture as shown in FIG. 4A and FIG. 4B.

In the foregoing aspect, the change of the horizontal position of the target part is represented by the movement animation in which the virtual character performs the movement, and the target object can be vividly prompted with the status of the current horizontal position of the target part. This is convenient for the target object to adjust the horizontal position of the target part, and improves the capturing efficiency.

To give a clearer hint to prompt the target object to adjust the horizontal position of the target part, in some aspects, in a case that the horizontal position of the target part relative to the image capturing element is not within a preset horizontal range, third prompt information is outputted when displaying the movement animation in which the virtual character performs the third movement, the third prompt information being configured for indicating the target object to adjust the horizontal position of the target part relative to the image capturing element.

Specifically, in a case that the horizontal position of the target part relative to the image capturing element is not within the preset horizontal range, the capturing device may display the third prompt information in a form of words, patterns, animations, or the like in the display interface by using the display element. For another example, the capturing device may display the third prompt information in a form of voice, music, or the like by using a sound playing element such as a speaker.

For example, as shown in FIG. 7A, the target part is the palm. When the target part is deviated to the left relative to the horizontal position of the image capturing element, a second prompt message of "the palm is too far to the left, I'm about to fall" is displayed in the display interface. As shown in FIG. 7B, when the target part is deviated to the right relative to the horizontal position of the image capturing element, a second prompt message of "the palm is too far to the right, I'm about to fall" is displayed in the display interface.

In the foregoing aspect, the third prompt information is outputted in combination with the movement animation in which the virtual character performs the third movement, it is timely and clearly fed back to the target object that the horizontal position of the target part is not within the preset horizontal range, to help the target object to adjust the horizontal position of the target part.

In addition to the change of the posture of the virtual character, the change of the horizontal position of the target part may alternatively be reflected by change of the posture of the virtual item controlled by the virtual character. In some aspects, the third movement includes an inclined movement performed by the virtual item controlled by the virtual character. Correspondingly, the in a case that the horizontal position of the target part relative to the image capturing element changes, displaying a movement animation in which the virtual character performs a third movement includes: in a case that the horizontal position of the target part relative to the image capturing element changes, displaying the virtual character controlling the virtual item to perform an inclined movement, an inclination direction of the virtual item being the same as an offset direction of the target part, and the offset direction being a direction corresponding to the horizontal position of the target part relative to the image capturing element.

Specifically, in a case that the spatial height of the target part relative to the image capturing element changes, the capturing device controls the display element to display the virtual character controlling the virtual item to be inclined, for example, the virtual character controlling the virtual item to be inclined to the left or to the right relative to a standard position of the virtual item. The standard position of the virtual item is a position at which the target part is located when the target part is within the preset horizontal range.

An inclination direction of the virtual item is the same as an offset direction of the target part, so that an orientation of the target part relative to the image capturing element is intuitively reflected. The offset direction is a direction corresponding to the horizontal position of the target part relative to the image capturing element, for example, when the horizontal position of the target part relative to the image capturing element is deviated to the left, the offset direction is left offset; when the horizontal position of the target part relative to the image capturing element is deviated to the right, the offset direction is right offset.

In the foregoing aspect, the change of the virtual item is kept in the same direction as the change of the target part, which is in line with the general law and general cognition, and can intuitively reflect the relationship between the orientation of the target part and the preset horizontal range. This can quickly help the target object to adjust the horizontal position of the target part, to ensure that the target part is in a correct orientation relative to the image capturing element, thereby improving the capturing efficiency.

In addition, besides the spatial height and the horizontal position, an inclination status of the target part may also affect the accuracy and efficiency of image capture. Therefore, in some aspects, that in a case that the relative position of the target part relative to the image capturing element changes, the currently displayed character posture of the virtual character changes according to the change of the relative position includes: in a case that the inclined posture of the target part relative to the image capturing element changes, displaying a movement animation in which the virtual character performs a fourth movement, the character posture of the virtual character during the fourth movement changing according to the change of the inclined posture.

Specifically, in a case that the inclined posture of the target part relative to the image capturing element changes, the capturing device controls the display element to display the movement animation in which the virtual character performs the fourth movement, and when the inclined posture changes during the fourth movement by the virtual character, the character posture of the virtual character changes according to the change of the inclined posture, or the posture of the virtual item controlled by the virtual character changes according to the change of the inclined posture. For example, when the target part is inclined, the virtual character is also inclined, and an inclination degree of the virtual character is positively correlated with an inclination degree of the target part.

In the foregoing aspect, the movement animation in which the virtual character performs the fourth movement is displayed, it can be timely and clearly fed back to the target object that the target part is inclined, to help the target object to quickly adjust an angle of the target part relative to the image capturing element, to ensure that the image capturing element captures a part image that meets the image quality standard.

The inclined posture includes an inclination angle and an inclination direction. In some aspects, at least three distance sensors are disposed around the image capturing element. The method further includes: in a case that the target part is within a capture range of the image capturing element, capturing at least three effective distances corresponding to a key area of the target part using the distance sensors; constructing a virtual plane of the key area based on the at least three effective distances; and determining an inclination angle and an inclination direction of the key area based on a relative angle between the virtual plane and a standard plane.

Specifically, in a case that the target part is within the capturing range of the image capturing element, the target part is within the detectable range of at least three distance sensors, to be specific, a projection area in which a key area of the target part is projected to a plane on which the distance sensor is located covers at least three distance sensors. Therefore, the capturing device can obtain the at least three effective distances outputted by the distance sensors. Based on the at least three effective distances, the capturing device constructs a virtual plane of the key area corresponding to the current posture of the target part. Therefore, based on a relative angle (such as a tangent angle) between the virtual plane and the standard plane, the capturing device can determine a relative posture of the key area, that is, the current inclined posture of the target part. In this way, based on the current inclined posture of the target part, the capturing device can control the display element to adjust a display status of the mapping pattern based on the relative posture.

For example, based on the relative posture of the key area, the capturing device calculates components of the relative posture in a height direction and a planar direction, and maps the components to changes in a display position and a display size of the mapping pattern respectively, to represent the current inclined posture of the target part.

Therefore, when the posture of the target part changes and the posture of the target part is inclined to a specific extent, real-time feedback may alternatively be performed through the display status of the mapping pattern, to ensure that the captured image is more accurate.

When the target part is inclined, moving at an excessively high speed, excessively close or excessively far, or excessively dark or excessively bright due to other factors, captured part images also have various conditions, resulting in low image quality. For example, when the moving speed is excessively high, the captured image may be blurred. Therefore, to ensure that quality of the captured image meets the criterion, in some aspects, before the image capturing element obtains the part image, the method further includes the following operation: obtaining a moving speed of the target part within the capture range of the image capturing element. When the moving speed is excessively high, the captured image may be blurred, which affects the accuracy of subsequent operations.

Specifically, the capturing device determines the moving speed of the target part based on a plurality of consecutive frames of images of the target part detected by the image capturing element, and according to at least one of a change amount in the spatial height or an offset amount in the horizontal position of the key area corresponding to the plurality of consecutive frames of images.

For example, the capturing device calculates a change amount between spatial heights of two adjacent frames based on consecutive N frames of images of the target part detected by the image capturing element. When the change amount is less than a preset threshold, the capturing device determines that the moving speed of the target part is appropriate and meets the capturing condition. For another example, the capturing device calculates an offset amount between horizontal positions of two adjacent frames based on consecutive N frames of images of the target part detected by the image capturing element. When the offset amount is less than a preset threshold, the capturing device determines that the moving speed of the target part is appropriate and meets the capturing condition. For still another example, the capturing device determines, only when both the change amount between the spatial heights of the two adjacent frames and the offset amount between the horizontal positions of the two adjacent frames meet the corresponding threshold conditions, that the moving speed of the target part is appropriate and meets the capturing condition.

Therefore, when it is determined based on the moving speed that the detected target part meets the capturing condition, the capturing device performs an operation of obtaining an image of the key area of the target part by using the image capturing element. Further, cases such as capturing failure and low image quality obtained through capturing when the target part moves at an excessively high speed within the visible range of the image capturing element are avoided, thereby improving the capturing accuracy and success rate, and further improving the capturing efficiency.

In consideration that the key area may be blocked by other objects in the actual scenario (for example, the palm is blocked by a sleeve), to ensure the capturing accuracy, in other aspects, before the image capturing element captures the image of the key area of the target part, the method further includes: performing integrity detection on the target part within the capture range of the image capturing element, to obtain an integrity detection result. Specifically, the capturing device controls the image capturing element to obtain an image of the target part, and performs integrity detection on the image of the target part, to obtain an integrity detection result. The integrity detection result is configured for indicating whether the key area of the target part is complete, in other words, whether the key area is blocked. When the target part is not blocked, the capturing device determines that the target part meets the capturing condition. For example, the capturing device may perform integrity detection on the image of the target part based on a skin color. For example, the capturing device extracts a pixel value in the key area of the target part, and compares the pixel value with a pixel value in a non-key area. When a difference in the pixel values exceeds a threshold, it indicates that the key area is blocked. For another example, the capturing device may use the pre-trained classification model, and input the image of the target part into the classification model. The classification model outputs the integrity detection result of whether the image is blocked.

In other aspects, to further ensure the capturing accuracy, an operation of capturing the part image by the image capturing element is performed when both the moving speed and the integrity detection result meet the capturing condition.

In some aspects, the method further includes: transmitting a captured part image of the target part to a server, the part image being configured for indicating the server to perform biometric authentication on the part image, and to perform resource transfer in a case that the biometric authentication is passed; and in a case that the biometric authentication is passed, receiving and displaying a resource transfer result fed back by the server.

Specifically, the capturing device transmits the captured part image to the server. After receiving the part image, the server performs biometric authentication on the part image. When the biometric authentication is passed, the server may perform the resource transfer operation related to the target object. For example, the server may use a palm print recognition model or the like to perform recognition on an image of the key area, extract one or more biological information such as the palm print, a palm shape, or a vein in the image, and perform recognition based on the one or more biological information, to determine whether the target object is a pre-registered object. When the target object is the pre-registered object, it is determined that the biometric authentication of the target object is passed. Certainly, when supported by a hardware condition of the capturing device, alternatively, the capturing device may process the image of the key area for biometric authentication.

The resource transfer operation means that when the biometric authentication is passed, the server transfers preset resources stored in an account bound to the target object in advance to a preset account.

Using a specific scenario as an example, when the target object passes the biometric authentication, the server takes out a preset amount of resources such as property and items in an account of the target object, and transfers the resources to another preset account. The preset account may be a business account. For example, a specific amount of money is paid to the business account. The preset account may alternatively be a non-business account. For example, money is transferred to the non-business account, or virtual items are transferred to the non-business account.

In some aspects, the capturing device further receives an authentication result returned by the server, and displays the authentication result in the display interface using the display element. For example, when the biometric authentication of the target object is passed, the capturing device receives the authentication result indicating that the authentication has been passed returned by the server, and displays a prompt such as "Congratulations! You have passed the authentication" or "Authentication success" in the display interface by using the display element, to feedback the authentication result to the target object.

In the foregoing aspect, the non-contact biometric authentication method avoids the requirement on the hardware device, and also avoids the inconvenience caused by forgetting to bring a portable terminal in the current common scenarios such as mobile phone payment and code scan payment. In addition, biometric authentication is performed by scanning the palm for resource transfer, which is more efficient and greatly improves the convenience.

This application further provides an application scenario. The application scenario is applicable to the foregoing image capturing method. Specifically, an application of the image capturing method in the application scenario is as follows: Using an example in which the target part is a palm, when a user enables a palm scan payment function on a device, the user needs to register for the server to store a palm image of the user. The user triggers the capturing device to perform a virtual character display operation to display an interface of the virtual character in an initial state. During a real-time detection process of the capturing device, when a height of the palm of the user relative to the image capturing element changes, the character posture of the virtual character also changes accordingly; when an orientation of the palm of the user relative to the image capturing element changes, the character posture of the virtual character also changes accordingly; or the like. Through the change of the character posture of the virtual character, the user is prompted to adjust the height, orientation, or the like of the palm, so that the user is guided to place the palm in an appropriate height range, and make the palm in an appropriate orientation relative to the image capturing element.

When the height and orientation of the palm of the user both meet the condition, the virtual character is displayed as being in a preset posture, and the user is guided to keep the current palm status unchanged. Correspondingly, the virtual character is displayed as maintaining the preset posture. When duration in which the character posture of the virtual character maintains the preset posture meets the preset capturing condition, the image capturing element is triggered to capture the part image, to complete image capture of the palm of the user, and then realize successful activation of the palm scan payment function.

In this way, through game interaction in the interface, the virtual character in the game interface gives corresponding feedback according to the change of the relative position of the palm and the capturing device, and the palm scan activation is completed during the game interaction, which improves the image capturing efficiency. Certainly, it is not limited thereto. The image capturing method provided in this application may alternatively be applied to other application scenarios, such as account registration and palm scan payment.

Figure 8:
FIG. 8 is a schematic diagram of an interface when in-air operation is disabled according to illustrative aspects.
Figure 9:
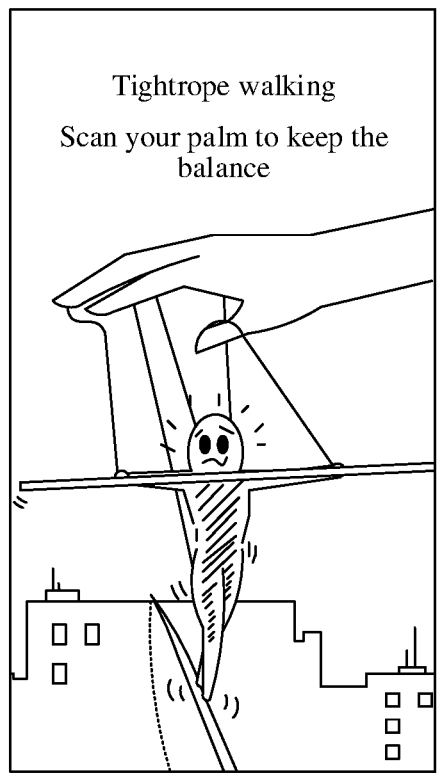
FIG. 9 is an introduction interface when in-air operation is enabled according to some illustrative aspects.

In a specific application scenario, before the user triggers the capturing device to perform the virtual character display operation, the capturing device controls the display element to display an interface shown in FIG. 8, to inform the user of relevant information of the capturing process. When the user extends the palm at the capturing device to enable in-air palm scan, that is, after the virtual character display operation is triggered, the capturing device controls the display element to display an interface shown in FIG. 9, to introduce the following operation process to the user using the screen.

Figure 10A:
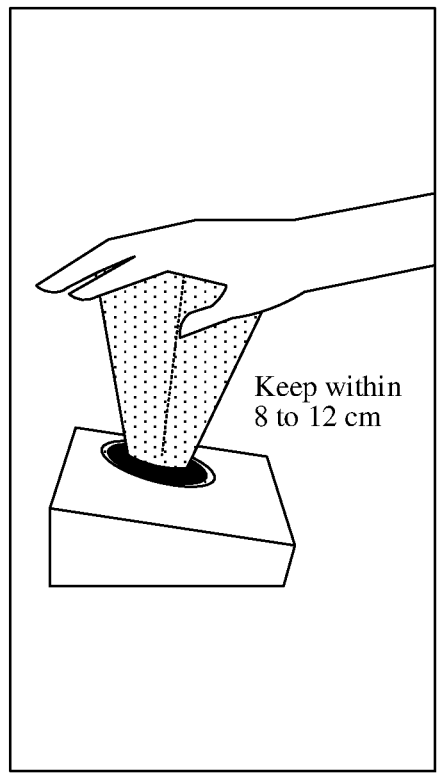
FIG. 10A is a schematic diagram of a scene when a palm is in an appropriate position according to some illustrative aspects.

In a state, as shown in FIG. 10A, when the user keeps the palm in a preset height range (for example, a height range of 8 to 12 cm) and within a preset horizontal range, the capturing device controls the display element to display the interface as shown in FIG. 4A. When the user keeps the palm in the preset height range and within the preset horizontal range for a period of time, the capturing device controls the display element to display the interface as shown in FIG. 4B.

Figure 10B:
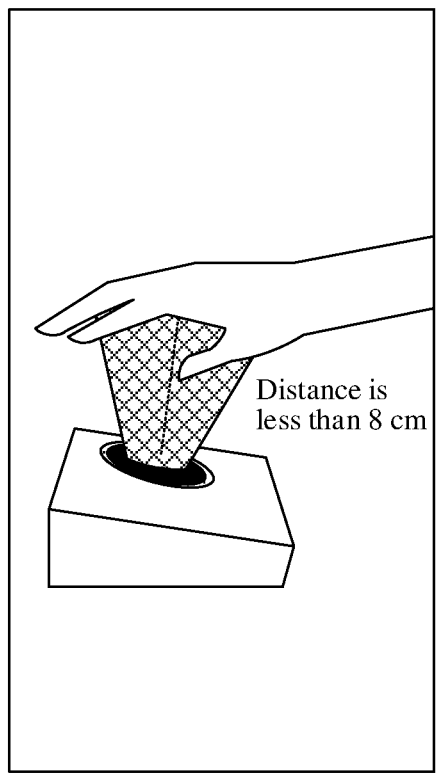
FIG. 10B is a schematic diagram of a scene when a palm is low according to some illustrative aspects.

In a state, as shown in FIG. 10B, when the palm of the user is low, for example, lower than 8 cm, the capturing device controls the display element to display an interface shown in FIG. 5A, showing that the virtual character is walking unstably, and a position of the rod held by the virtual character is low.

Figure 10C:
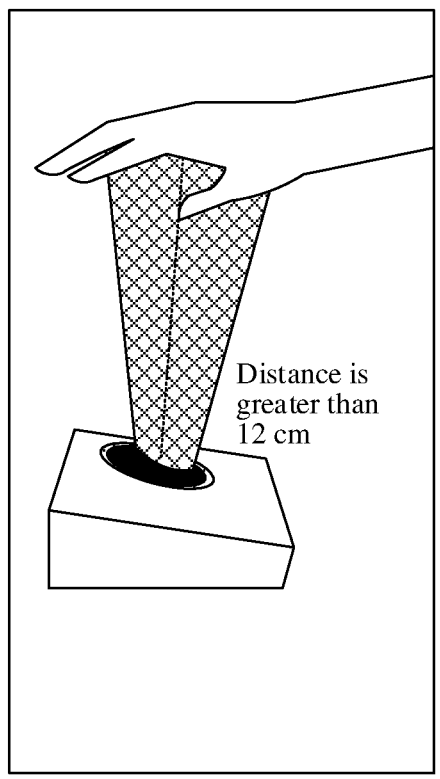
FIG. 10C is a schematic diagram of a scene when a palm is high according to some illustrative aspects.

In a state, as shown in FIG. 10C, when the palm of the user is high, for example, higher than 12 cm, the capturing device controls the display element to display an interface shown in FIG. 5B, showing that the virtual character is walking unstably, and a position of the rod held by the virtual character is high.

In a state, when the palm of the user is in an orientation near the left, the capturing device controls the display element to display an interface as shown in FIG. 7A.

In a state, when the palm of the user is in an orientation near the right, the capturing device controls the display element to display an interface as shown in FIG. 7B.

Figure 11A:
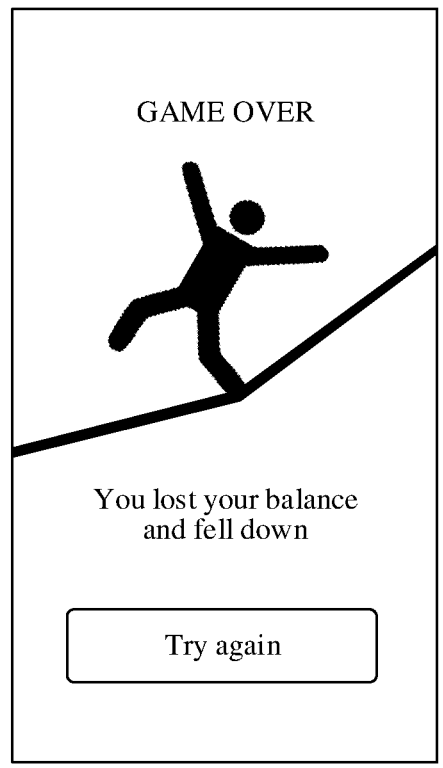
FIG. 11A is a schematic diagram of a capture failure interface according to some illustrative aspects.
Figure 11B:
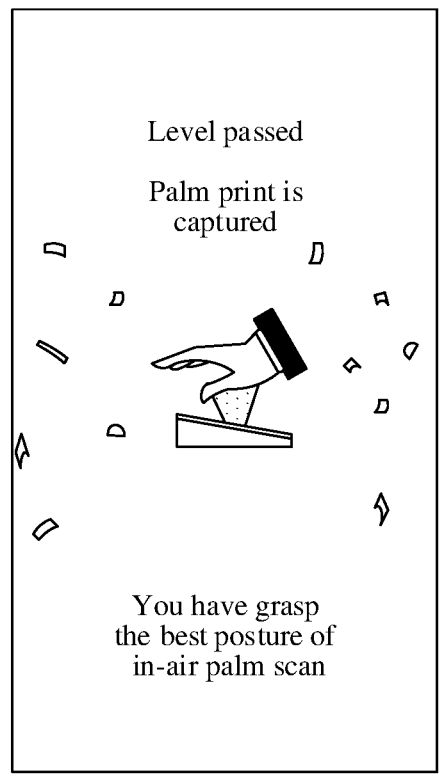
FIG. 11B is a schematic diagram of a capture success interface according to some illustrative aspects.

When the palm of the user is in one or more states of being low, high, near the left, or near the right for a specific period of time, the capturing device controls the display element to display an interface shown in FIG. 11A, to prompt the user that the capture is not successful. After the capture succeeds, the capturing device may further control the display element to display an interface shown in FIG. 11B.

In this way, through the gamified display, boring time when capturing the part images is reduced, and the recognition process of user palms by the capturing device is simpler and more interesting. Based on the relative position of the capturing device and the palm, the distance and position are displayed on the screen through the walking balance status of the game character, allowing users to easily adjust to the appropriate distance and position, thereby helping the user to adjust the position of the palm during payment. In this way, there can be strong interaction between the user and the device, and user experience is better.

Figure 12:
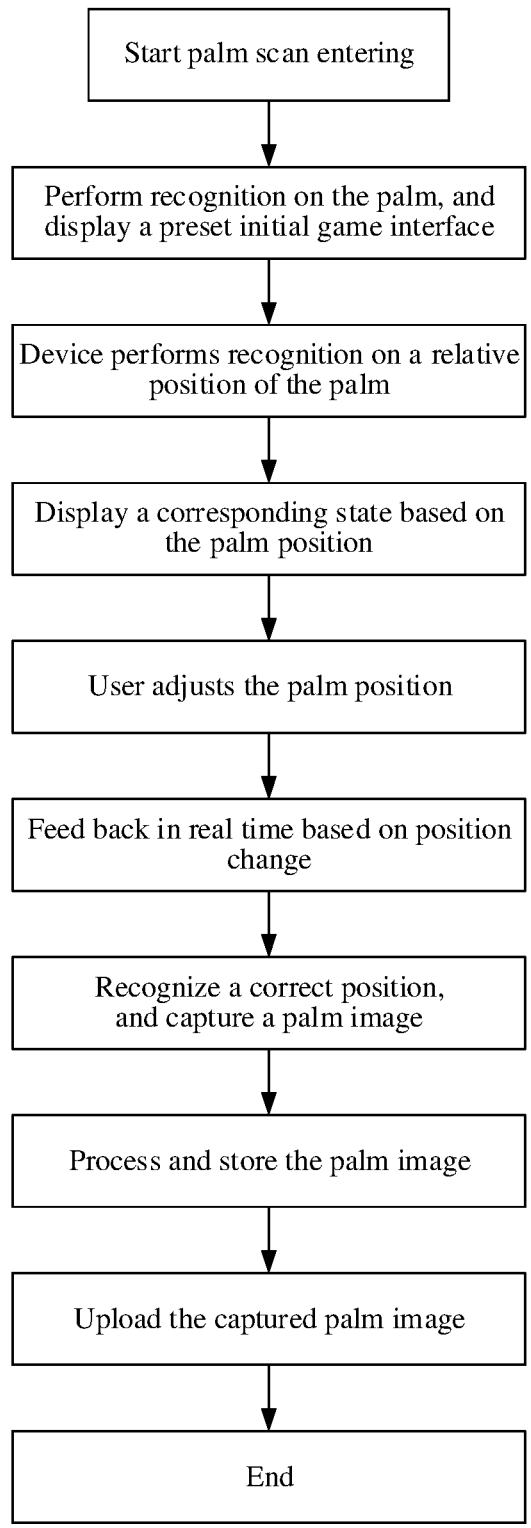
FIG. 12 is a schematic flowchart of a scenario according to some illustrative aspects.

In a specific example, an overall process of this aspect of this application may be shown in FIG. 12. After the user starts palm scan entering, the capturing device perform recognition on the palm, and displays a preset initial game interface in the display interface. The capturing device performs recognition on a relative position of the palm, and displays a corresponding posture of the virtual character in the display interface according to the relative position of the palm. Usually, the relative position of the palm of the user is not in the appropriate range at the beginning. Therefore, the user adjusts the relative position of the palm, and the capturing device performs real-time feedback according to the change of the relative position of the palm. When the palm of the user is located in the correct position, the capturing device controls the image capturing element to capture a palm image, and performs corresponding processing (such as cutting or gray scaling) and stores the palm image. Then, the capturing device uploads the captured palm image to the server.

Figure 13:
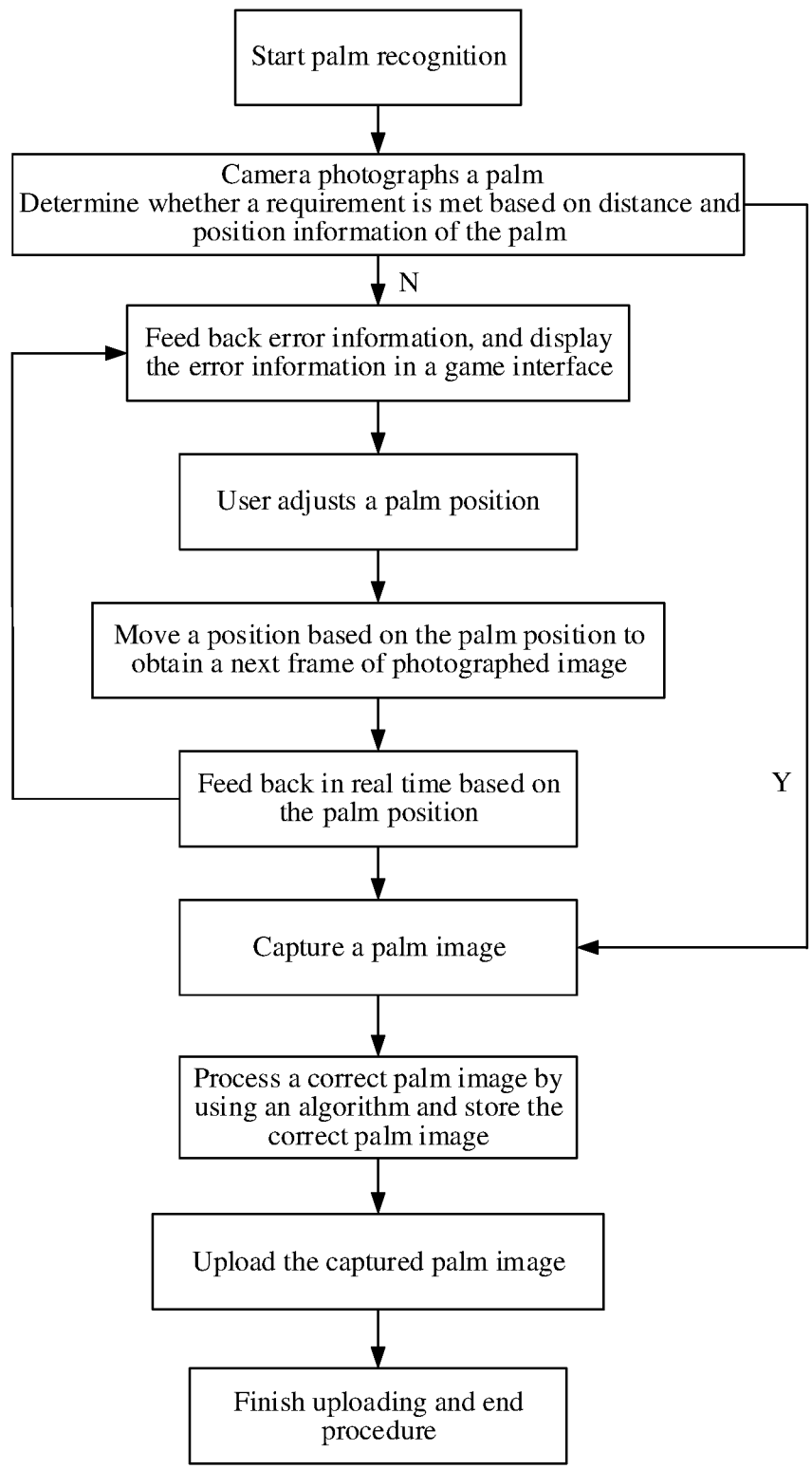
FIG. 13 is a schematic flowchart of algorithm recognition according to some illustrative aspects.

As shown in FIG. 13, when the capturing device starts to perform recognition on the palm, the capturing device controls a camera in the image capturing element to photograph the palm, and determines, based on the palm distance and position information, whether an image capturing requirement is met. When a detected relative position of the palm does not meet the image capturing requirement, the capturing device controls the display element to feed back error information, and displays the error information in the game interface through a posture of the virtual character, to guide the user to adjust the position of the palm. Then, the capturing device obtains the next frame of image photographed by the image capturing element, and also performs the operations of recognition, real-time feedback, and the like. When the palm of the user is located in the correct position, the capturing device controls the image capturing element to capture and store the palm image, and then uploads the palm image to the server for processing by the server such as storage and coding.

Operations in flowcharts of the foregoing aspects are displayed in sequence based on indication of arrows, but the steps are not necessarily performed in sequence based on a sequence indicated by the arrows. Unless clearly described in this specification, a sequence of performing the steps is not strictly limited, and the steps may be performed in another sequence. In addition, at least some steps in the foregoing aspects may include a plurality of steps or a plurality of stages, and these steps or stages are not necessarily performed at a same time instant, but may be performed at different time instants. The steps or stages are not necessarily performed in sequence, but may be performed by turn or alternately with other steps or at least part of steps or stages in other steps.

Another aspect of this application further provides an image capturing apparatus for implementing the foregoing image capturing method. The implementation solution for solving the problem provided by this apparatus is similar to the implementation solution recorded in the foregoing method. Therefore, for the specific limitations in one or more aspects of the image capturing apparatus provided below, refer to the foregoing limitations for the image capturing method, and the descriptions are not repeated herein again.

Figure 14:
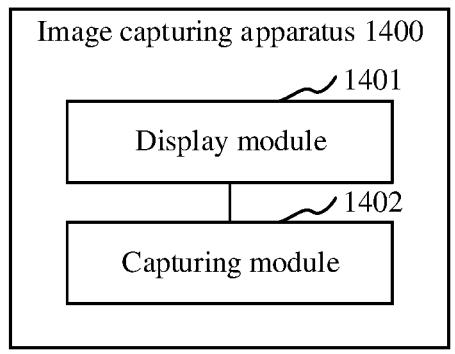
FIG. 14 is a structural block diagram of an image capturing apparatus according to some illustrative aspects.

In some aspects, as shown in FIG. 14, an image capturing apparatus 1400 is provided, including a display module 1401 and a capturing module 1402.

The display module 1401 is configured to display a virtual character in response to a virtual character display operation triggered by a target part of a target object.

The display module 1401 is further configured to control a character posture of the virtual character based on a relative position of the target part relative to an image capturing element.

The capture module 1402 is configured to: in a case that duration in which the character posture of the virtual character remains a preset posture satisfies a preset capturing condition, trigger the image capturing element to capture a part image of the target part in air.

In some aspects, the apparatus further includes a first output module, configured to: in a case that the relative position of the target part relative to the image capturing element is within a preset position range, display a movement animation in which the virtual character performs a first movement in a preset posture; and output first prompt information, the first prompt information being configured for indicating the target object to maintain a state in which the target part and the image capturing element are relative static, to cause the character posture of the virtual character to remain the preset posture.

In some aspects, the relative position of the target part relative to the image capturing element includes a spatial height of the target part relative to the image capturing element, and the display module is further configured to: in a case that the spatial height of the target part relative to the image capturing element changes, control the display element to display a movement animation in which the virtual character performs a second movement, the character posture of the virtual character during the second movement changing according to the change of the spatial height.

In some aspects, the relative position of the target part relative to the image capturing element includes a horizontal position of the target part relative to the image capturing element, and the display module is further configured to: in a case that the horizontal position of the target part relative to the image capturing element changes, control the display element to display a movement animation in which the virtual character performs a third movement, the character posture of the virtual character during the third movement changing according to the change of the horizontal position.

In some aspects, the display module is further configured to: in a case that the spatial height of the target part relative to the image capturing element changes, control the display element to display the virtual character controlling a virtual item to perform a vertical movement, a direction of the vertical movement of the virtual item and a distance between the virtual item and the virtual character corresponding to the spatial height of the target part relative to the image capturing element.

In some aspects, the display module is further configured to: in a case that the spatial height of the target part relative to the image capturing element becomes higher, control the display element to display the virtual character controlling the virtual item to perform a vertical upward movement; and in a case that the spatial height of the target part relative to the image capturing element becomes lower, display the virtual character controlling the virtual item to perform a vertical downward movement.

In some aspects, the display module is further configured to: in a case that the spatial height of the target part relative to the image capturing element changes, determine a current spatial height of the target part relative to the image capturing element; determine a height difference between the spatial height and a preset height; map the height difference to a relative distance between the virtual item and the virtual character based on a preset distance mapping relationship, a large height difference indicating a large relative distance; and control the display element to display the virtual character operating the virtual item, to cause the virtual item to perform a vertical movement according to the change of the spatial height.

In some aspects, a plurality of distance sensors are deployed around the image capturing element, and the display module is further configured to: in a case that the target part is within a capture range of the image capturing element, capture a plurality of effective distances corresponding to a key area of the target part using the plurality of distance sensors; and determine the current spatial height of the target part relative to the image capturing element based on the plurality of effective distances.

In some aspects, the display module is further configured to: in a case that the horizontal position of the target part relative to the image capturing element changes, control the display element to display the virtual character controlling the virtual item to perform an inclined movement, an inclination direction of the virtual item being the same as an offset direction of the target part, and the offset direction being a direction corresponding to the horizontal position of the target part relative to the image capturing element.

In some aspects, the apparatus further includes a second output module, configured to: in a case that the spatial height of the target part relative to the image capturing element is not within a preset height range, control the display element to output second prompt information when displaying the movement animation in which the virtual character performs the second movement, the second prompt information being configured for indicating the target object to adjust the spatial height of the target part relative to the image capturing element.

In some aspects, the apparatus further includes a third output module, configured to: in a case that the horizontal position of the target part relative to the image capturing element is not within a preset horizontal range, control the display element to output third prompt information when displaying the movement animation in which the virtual character performs the third movement, the third prompt information being configured for indicating the target object to adjust the horizontal position of the target part relative to the image capturing element.

In some aspects, the relative position of the target part relative to the image capturing element includes an inclined posture of the target part relative to the image capturing element, and the display module is further configured to: in a case that the inclined posture of the target part relative to the image capturing element changes, control the display element to display a movement animation in which the virtual character performs a fourth movement, the character posture of the virtual character during the fourth movement changing according to the change of the inclined posture.

In some aspects, at least three distance sensors are disposed around the image capturing element, the inclined posture of the target part relative to the image capturing element includes an inclination angle of the target part relative to the image capturing element and an inclination direction of the target part relative to the image capturing element, and the apparatus further includes a determining module, configured to: in a case that the target part is within a capture range of the image capturing element, capture at least three effective distances corresponding to a key area of the target part using the distance sensors; construct a virtual plane of the key area based on the at least three effective distances; and determine an inclination angle and an inclination direction of the key area based on a relative angle between the virtual plane and a standard plane.

In some aspects, the apparatus further includes a detection module, configured to: perform target detection and liveness detection on a target appearing within the capture range of the image capturing element; and in a case that it is detected that the target is the target part of the target object and a living body is detected, determine that the target part of the target object triggers an authentication operation.

In some aspects, the apparatus further includes an uploading module, configured to transmit a captured part image of the target part to a server, the part image being configured for indicating the server to store the part image in association with the target object for biometric authentication of the target object based on the associatively stored part image when the target part of the target object triggers the authentication operation.

In some aspects, the apparatus further includes a transmission module, configured to: transmit a captured part image of the target part to a server, the part image being configured for indicating the server to perform biometric authentication on the part image, and to perform resource transfer in a case that the biometric authentication is passed; and in a case that the biometric authentication is passed, receive a resource transfer result fed back by the server. The display module is further configured to display the resource transfer result.

Each module in the image capturing apparatus may be completely or partially realized by using software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In some aspects, a computer device is provided. The computer device may be a capturing device in the foregoing aspects, and a diagram of an internal structure of the computer device may be shown in FIG. 15. The computer device includes a processor, a memory, an input/output interface, a communication interface, a display element, and an image capturing element. The processor, the memory, and the input/output interface are connected through a system bus, and the communication interface, the display element, and the image capturing element are connected to the system bus through the input/output interface. The processor of the computer device is configured to provide computing and control capabilities. The memory of the computer device includes a non-volatile storage medium and an internal memory. The non-volatile storage medium stores an operating system and a computer program. The internal memory provides an environment for operation of the operating system and the computer program in the non-volatile storage medium. The input/output interface of the computer device is configured to exchange information between the processor and an external device. The communication interface of the computer device is configured to communicate with an external terminal in a wired or a wireless manner, and the wireless manner can be implemented by using Wi-Fi, a mobile cellular network, near field communication (NFC), or other technologies. The computer program, when executed by the processor, implements a biometric authentication method. The display element of the computer device is configured to form a visually visible picture, and may be a display screen, a projection apparatus, or a virtual reality imaging apparatus. The display screen may be a liquid crystal display screen or an electronic ink display screen. The input apparatus of the computer device may be a touch layer covering the display screen, or may be a key, a trackball, or a touch pad disposed on a housing of the computer device, or may be an external keyboard, touch pad, mouse, or the like.

Figure 15:
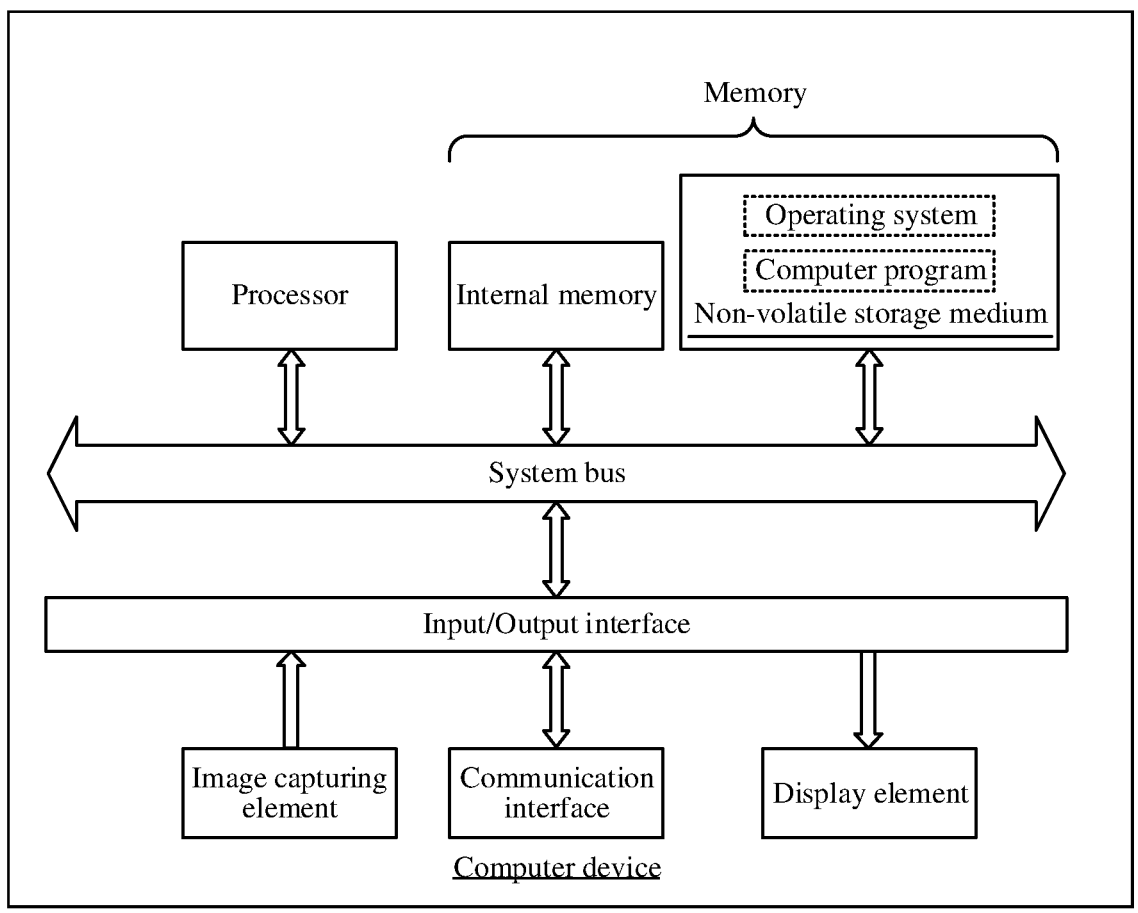
FIG. 15 is an internal structural diagram of a computer device according to some illustrative aspects.

A person skilled in the art may understand that, the structure shown in FIG. 15 is merely a block diagram of a part of a structure related to a solution of this application and does not limit the computer device to which the solution of this application is applied. Specifically, the computer device may include more or fewer components than those in the drawings, or some components are combined, or a different component deployment is used.

In some aspects, a computer device is further provided, including a memory and a processor. The memory stores a computer program, and the processor, when executing the computer program, implements the operations in the foregoing method aspects.

In some aspects, a computer-readable storage medium is provided, having a computer program stored therein. The computer program, when executed by a processor, implements the operations in the foregoing method aspects.

In some aspects, a computer program product is provided, including a computer program. The computer program, when executed by a processor, implements the operations in the foregoing method aspects.

The user information (including, but not limited to, information about a hand part of a user, user account information, and the like) and data (including, but not limited to, data for analysis, stored data, displayed data, and the like) involved in this application all are information and data that are authorized by the user or fully authorized by each party, and the collection, use, and processing of relevant data need to comply with relevant laws and regulations of relevant countries and regions.

A person of ordinary skill in the art may understand that all or some of the procedures of the methods in the aspects may be implemented by using a computer program instructing relevant hardware. The computer program may be stored in a non-volatile computer-readable storage medium. When the computer program runs, the procedures of the methods in the aspects are performed. Any reference to a memory, a database, or another medium used in the aspects provided in this application may include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, and the like. The volatile memory may include a random access memory (RAM) or an external cache. For the purpose of description instead of limitation, the RAM is available in a plurality of forms, such as a static random access memory (SRAM) or a dynamic random access memory (DRAM). The database involved in the aspects provided in this application may include at least one of a relational database and a non-relational database. The non-relational database may include a blockchain-based distributed database, but is not limited thereto. The processor involved in the aspects provided in this application may be a general-purpose processor, a central processing unit, a graphics processing unit, a digital signal processor, a programmable logic device, a quantum computing-based data processing logic device, and are not limited thereto.

Technical features of the foregoing aspects may be combined in different manners to form other aspects. For concise description, not all possible combinations of the technical features in the aspect are described. However, the combinations of the technical features are all to be considered as falling within the scope described in this specification provided that they do not conflict with each other.

The foregoing aspects only describe several implementations of this application, and are described in detail, but are not to be construed as a limitation to the patent scope of this application. A person of ordinary skill in the art may make various changes and improvements without departing from the ideas of this application, which shall all fall within the protection scope of this application. Therefore, the protection scope of this application is not to be subject to the appended claims.

What is claimed is:

1. A method comprising:
   detecting a target part of a target object within a sensing range of a contactless capturing device;
   triggering, responsive to the detecting, a virtual character display operation, wherein during the virtual character display operation a posture of a virtual character is controlled in real-time based on a relative position of the target object to an image capture element of the capturing device;
   animating the virtual character, while the position of the target part relative to the image capturing element is within a preset position range, based on the relative position of the target object to the image capture element of the capturing device; and
   capturing an image of the target part when the posture of the virtual character satisfied a preset capturing condition.

2. The method of claim 1, wherein the animating comprises:
   animating, while the position of the target part relative to the image capturing element is within a preset position range, the virtual character to perform a first movement in a preset posture; and
   displaying first prompt information indicating the target object to maintain a static state between the target part and the image capturing element to continue the first movement of the virtual character in the preset posture.

3. The method of claim 1, wherein the relative position comprises a spatial height, and the method further comprises:
   controlling the posture of the virtual character to perform a second movement, wherein the character posture of the virtual character during the second movement is maintained based on the spatial height.

4. The method according to claim 3, wherein the second movement comprises a vertical movement, and the method further comprises:
   displaying the virtual character controlling a virtual item to perform a vertical movement, a direction of the vertical movement of the virtual item and a distance between the virtual item and the virtual character corresponding to the spatial height of the target part relative to the image capturing element.

5. The method according to claim 4, further comprising:
   when the spatial height of the target part relative to the image capturing element becomes higher, animating the virtual character to perform a vertical upward movement of the virtual item; and
   when the spatial height of the target part relative to the image capturing element becomes lower, animating the virtual character to perform a vertical downward movement of the virtual item.

6. The method of claim 4, further comprising:
   determining a current spatial height of the target part relative to the image capturing element;
   determining a height difference between the spatial height and a preset height;
   mapping the height difference to a relative distance between the virtual item and the virtual character based on a preset distance mapping relationship, a large height difference indicating a large relative distance; and displaying the virtual character operating the virtual item, to cause the virtual item to perform a vertical movement according to the change of the spatial height.

7. The method of claim 6, wherein the capturing device comprises a plurality of distance sensors deployed around the image capturing element, and the determining the current spatial height of the target part relative to the image capturing element comprises:
capturing, when the target part is within a capture range of the image capturing element, a plurality of effective distances corresponding to a key area of the target part using the plurality of distance sensors; and
determining the current spatial height of the target part relative to the image capturing element based on the plurality of effective distances.

8. The method according to claim 3, further comprising:
determining whether the spatial height is within a preset height range;
output second prompt information when the spatial height is not within the preset height range, wherein the second prompt indicates the target object to adjust the spatial height of the target part relative to the image capturing element, so that the spatial height of the target part relative to the image capturing element moves within the preset height range.

9. The method of claim 1, wherein the relative position comprises a horizontal position, and the method further comprises:
animating the posture of the virtual character to perform a third movement, wherein the character posture of the virtual character during the third movement is maintained based on the horizontal position.

10. The method of claim 9, further comprising:
animating the virtual character controlling the virtual item to perform an inclined movement as the horizontal position changes, wherein an inclination direction of the virtual item corresponding to an offset direction of the target part, and the offset direction being a direction corresponding to the horizontal position of the target part relative to the image capturing element.

11. The method of claim 9, further comprising:
determining whether the horizontal position is within a preset horizontal range;
output third prompt information when the horizontal position is not within the preset horizontal range, wherein the third prompt indicates the target object to move the target part relative to the image capturing element so that the horizontal position of the target part relative to the image capturing element becomes within the preset horizontal range.

12. The method of claim 1, wherein the relative position comprises an inclined posture, and the method further comprises:
animating the posture of the virtual character to perform a fourth movement, wherein the character posture of the virtual character during the fourth movement is maintained based on the inclined posture.

13. The method of claim 12, wherein the capture device comprises at least three distance sensors disposed around the image capturing element, the inclined posture comprises an inclination angle and an inclination direction, and the method further comprises:
capturing, when the target part is within a capture range of the image capturing element, at least three effective distances corresponding to a key area of the target part using the distance sensors;
constructing a virtual plane of the key area based on the at least three effective distances; and
determining the inclination angle and the inclination direction of the key area based on a relative angle between the virtual plane and a standard plane.

14. The method of claim 1, further comprising:
performing target detection and liveness detection on a target appearing within a capture range of the image capturing element; and
triggering an authentication operation when the target is the target part of the target object and a living body is detected.

15. The method of claim 1, further comprising:
transmitting the captured image to a server, wherein the transmission is configured to cause the server to perform biometric authentication of the target object based on associatively stored target part data.

16. The method of claim 15, further comprising:
receiving an indication from the server that biometric authentication was successful; and
displaying the results of a resource transfer performed by the server based on the successful authentication.

17. The method of claim 1, wherein the target object is a human individual, and the target part is a skin pattern of the human individual.

18. The method of claim 17, wherein the skin pattern is one of a fingerprint and a palm print.

19. One or more non-transitory computer readable media storing computer readable instructions which, when executed by a processor, configure a data processing system to perform:
detecting a target part of a target object within a sensing range of a contactless capturing device;
triggering, responsive to the detecting, a virtual character display operation, wherein during the virtual character display operation a posture of a virtual character is controlled in real-time based on a relative position of the target object to an image capture element of the capturing device;
animating the virtual character, while the position of the target part relative to the image capturing element is within a preset position range, based on the relative position of the target object to the image capture element of the capturing device; and
capturing an image of the target part when the posture of the virtual character satisfied a preset capturing condition.

20. A system comprising:
a processor; and
memory storing computer readable instructions which, when executed by the processor, configure the system to perform:
detecting a target part of a target object within a sensing range of a contactless capturing device;
triggering, responsive to the detecting, a virtual character display operation, wherein during the virtual character display operation a posture of a virtual character is controlled in real-time based on a relative position of the target object to an image capture element of the capturing device;
animating the virtual character, while the position of the target part relative to the image capturing element is within a preset position range, based on the relative position of the target object to the image capture element of the capturing device; and capturing an image of the target part when the posture of the virtual character satisfied a preset capturing condition.

\* \* \* \* \*